(12) United States Patent
Laroia et al.

(10) Patent No.: US 7,379,446 B2
(45) Date of Patent: May 27, 2008

(54) ENHANCED BEACON SIGNALING METHOD AND APPARATUS

(75) Inventors: Rajiv Laroia, Basking Ridge, NJ (US);
Frank A. Lane, Asbury, NJ (US);
Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 740 days.

(21) Appl. No.: 10/965,011

(22) Filed: Oct. 14, 2004

(65) Prior Publication Data

US 2006/0083189 A1    Apr. 20, 2006

(51) Int. Cl.
*H04J 3/00* (2006.01)
*H04J 4/00* (2006.01)
*H04B 7/00* (2006.01)

(52) U.S. Cl. .................. 370/345; 370/278; 370/282; 370/311; 370/318; 370/478; 455/522; 455/561

(58) Field of Classification Search ............... 370/278, 370/282, 311, 318, 345, 478; 455/522, 561
See application file for complete search history.

(56) References Cited

U.S. PATENT DOCUMENTS

| | | | |
|---|---|---|---|
| 5,355,367 | A | 10/1994 | Comroe et al. |
| 5,410,538 | A | 4/1995 | Roche et al. |
| 5,561,842 | A | 10/1996 | Ritter et al. |
| 5,561,852 | A | 10/1996 | Heeschen et al. |
| 5,570,352 | A | 10/1996 | Poyhonen |
| 5,867,478 | A | 2/1999 | Baum et al. |

(Continued)

FOREIGN PATENT DOCUMENTS

EP    0 833 456    4/1998

(Continued)

OTHER PUBLICATIONS

Wang C.C., et al., "Dynamic Channel Resource Allocation in Frequency Hopped Wireless Communication Systems," Information Theory, 1994, Proceedings., 1994 IEEE International Symposium on Trondheim, Norway 26, Jun. and Jul. 1994, New York, NY, USA, IEEE.

(Continued)

*Primary Examiner*—Ricky Q. Ngo
*Assistant Examiner*—Chandrahas Patel
(74) *Attorney, Agent, or Firm*—Straub & Pokotylo; Michael P. Straub; Ronald P. Straub

(57) ABSTRACT

Methods and apparatus for using high power narrow signals, e.g., tones, for communicating transmitter information without putting the full transmission power available into the transmitted tone or tones are described. User data is transmitted in parallel with transmitter information in many embodiments with the user data being allocated more than 20% of the transmitter's maximum output power in many cases. By using an amount of power on the tones used to communicate transmitter information while simultaneously transmitting user data with more than 20% of the available transmission power, efficient bandwidth utilization is achieved while still ensuring a high probability that that the transmitter information signals will be received and detectable using simple energy detection techniques and without the need for timing synchronization with the transmitter to be achieved for success interpretation of the transmitter information.

61 Claims, 14 Drawing Sheets

U.S. PATENT DOCUMENTS

| | | | |
|---|---|---|---|
| 5,911,120 | A | 6/1999 | Jarett et al. |
| 6,005,856 | A | 12/1999 | Jensen et al. |
| 6,018,317 | A | 1/2000 | Dogan et al. |
| 6,038,450 | A | 3/2000 | Brink et al. |
| 6,064,692 | A | 5/2000 | Chow |
| 6,078,571 | A | 6/2000 | Hall |
| 6,078,823 | A | 6/2000 | Chavez et al. |
| 6,088,592 | A | 7/2000 | Doner et al. |
| 6,118,805 | A | 9/2000 | Bergstrom et al. |
| 6,161,000 | A | 12/2000 | Yang et al. |
| 6,275,518 | B1 | 8/2001 | Takahashi et al. |
| 6,377,566 | B1 | 4/2002 | Cupo et al. |
| 6,377,636 | B1 | 4/2002 | Paulraj et al. |
| 6,385,188 | B1 | 5/2002 | Kim et al. |
| 6,400,704 | B2 | 6/2002 | Mikuni et al. |
| 6,473,418 | B1 | 10/2002 | Laroia et al. |
| 6,473,467 | B1 | 10/2002 | Wallace et al. |
| 6,542,485 | B1 | 4/2003 | Mujtaba |
| 6,587,526 | B1 | 7/2003 | Li et al. |
| 6,647,066 | B1 | 11/2003 | Szajnowski |
| 6,661,771 | B1 | 12/2003 | Cupo et al. |
| 6,665,277 | B1 | 12/2003 | Sriram et al. |
| 6,711,120 | B1 | 3/2004 | Laroia et al. |
| 6,751,444 | B1 | 6/2004 | Meiyappan |
| 6,768,714 | B1 | 7/2004 | Heinonen et al. |
| 6,810,254 | B2 | 10/2004 | Tiedemann et al. |
| 6,842,444 | B2 * | 1/2005 | Bolgiano et al. ............ 370/335 |
| 7,142,888 | B2 * | 11/2006 | Okawa et al. ............... 455/561 |
| 7,272,409 | B2 * | 9/2007 | Dillon et al. ................ 455/522 |
| 7,308,279 | B1 * | 12/2007 | Zweig ......................... 455/522 |
| 2001/0043578 | A1 | 11/2001 | Kumar et al. |
| 2002/0019228 | A1 | 2/2002 | McKenna et al. |
| 2002/0045451 | A1 | 4/2002 | Hwang et al. |
| 2002/0067774 | A1 | 6/2002 | Razoumov et al. |
| 2002/0086708 | A1 | 7/2002 | Teo et al. |
| 2002/0122383 | A1 | 9/2002 | Wu et al. |
| 2002/0154705 | A1 | 10/2002 | Walton et al. |
| 2003/0114127 | A1 | 6/2003 | Baldwin |
| 2003/0194029 | A1 | 10/2003 | Heinonen et al. |
| 2004/0109432 | A1 | 6/2004 | Laroia et al. |
| 2004/0233871 | A1 | 11/2004 | Seki et al. |

FOREIGN PATENT DOCUMENTS

| | | |
|---|---|---|
| EP | 1043861 | 10/2000 |
| EP | 1148673 | 10/2001 |
| WO | WO 97/26742 | 7/1997 |
| WO | WO 98/59450 | 12/1998 |

OTHER PUBLICATIONS

Fazel, K., et al., "A Flexible and High Performance Cellular Mobile Communications System Based on Orthogonal Multi-Carrier SSMA," Wireless Personal Communications, Kluwer Academic Publishers, NK, vol. 2, No.½ 1995, pp. 121-144.

G.J. Pottie and A.R. Calderbank, "Channel Coding Strategies for Cellular Radio," pp. 763-770 of IEEE Transactions on Vehicular Technology, vol. 44, No. 4 (Nov. 1995).

Aue, Fettweis, "Multi-carrier spread spectrum modulation with reduced dynamic range," IEEE Vehicular Technology Conference (Apr. 28, 1996-May 4, 1996), pp. 914-917.

Iida, Marubayashi, "Multi-tone combinatory frequency hopping system," IEEE International Symposium on Spread Spectrum Techniques and Applications, Sep. 22-25, 1996, pp. 893-897.

Tufvesson F. et al., "Pilot Assisted Channel Estimation For OFDM in Mobile Cellular Systems," 1997 IEEE 47th Vehicular Technology Conference, Phoenix, May 4-7, 1997, IEEE Vehicular Technology Conference, New York, IEEE, US, vol. 3, Conf. 47.

R. Negi, et al., "Pilot Tone Selection for Channel Estimation in a Mobile OFDM System," IEEE Transactions on Consumer Electronics, pp. 1122-1128, 1998.

Reimers U., "Digital Video Broadcasting," IEEE Communications Magazing, IEEE Service Center, Piscataway, NJ, US, vol. 36, No. 6, Jun. 1, 1998, pp. 104-110.

Fernandez-Getino Garcia J., et al, "Efficient Pilot Patterns for Channel Estimation in OFDM Systems Over HF Channels," VTC 1999-Fall. IEEE VTS 50th , IEEE Vehicular Technology Conference, Gateway to the 21st Century Communications Village, Amsterdam, Sep. 19-22, 1999, IEEE Vehicular Technology Conference, New York, NY, IEEE, US, vol. 4, Conf. 50, pp. 2193-2197.

Han, D.S. et al., "On the Synchronization of MC-CDMA System for Indoor Wireless Communications," VIC 1999-Fall. IEEE VTS 50th, Vehicular Technology Conference, Gateway to the 21st Century Communications Village, Amsterdam, Sep. 19-22, 1999, IEEE Vehicular Technology Conference, New York, NY, IEEE, US, vol. 2, Conf. 50, pp. 693-697.

Chen, Hong et al., "An Orthogonal Projection-based Approach for PAR Reduction in OFDM," IEEE Communications Letters, May 2002, vol. 6, iss. 5, p. 169-171.

Chan-Soo, Hwang, "A Peak Power Reduction Method for Multicarrier Transmission," IEEE International Conference on Communications, Jun. 11-14, 2001, vol. 5, p. 1496-1500.

International Search Report from International Application No. PCT/US2004/034191 pp. 1-2; dated: Jun. 27, 2006.

International Preliminary Report on Patentability ,dated: Apr., 17,2007 with Written Opinion of International Searching Authority from International Application No. PCT/US2004/034191, pp. 1-8.

* cited by examiner

ENHANCED BEACON SIGNALING METHOD AND APPARATUS

FIELD OF INVENTION

The present invention is related to communications systems, and more particularly, to methods and apparatus for transmitting information in a multi-user communications system.

BACKGROUND

Multiple access communications systems are common today. In such systems, multiple devices, e.g., wireless terminals, may have the ability to communicate with a base station at the same time. Multiple access communication systems are often implemented as cellular systems, where each cell normally corresponds to the coverage area of a single base station. Cells may include one or more different sectors. In sectorized cases, base stations often include different transmitters for different sectors. In addition, different sectors may use the same or different carrier frequencies.

Spread spectrum OFDM (orthogonal frequency division multiplexing) multiple access, is one example of a spectrally efficient wireless communications technology. OFDM can be used to provide wireless communication services. In OFDM spread spectrum system, the total spectral bandwidth is normally divided into a number of orthogonal tones, e.g. subcarrier frequencies. In a cellular network, the same bandwidth is often reused in all the cells of the system.

In various multiple access communications systems, there is a need to communicate transmitter information to wireless terminals, e.g., information indicating the carrier used by a particular transmitter, cell identification information, and/or sector identification information. While transmitting such information at extremely high power can increase the chance of detection of the transmitted information, it can lead to excessive and/or unnecessary interference, e.g., in cells or sectors several cells away from the transmitter. Dedicating huge amounts of power to transmitting transmitter information signals can also limit the amount of data that can be transmitted in a system since power allocated to transmitting the transmitter information signals may not be available for transmitting user data, e.g., text, video or speech data.

In view of the above discussion, it should be appreciated there is a need for methods and apparatus directed to the problem of communicating transmitter information in a reliable and easy to detect manner while limiting the amount of signal interference generated by signals used to transmit such information and also balancing the need to allocate power to such transmission with the importance of allocating power to the transmission of user data.

SUMMARY

The present invention is directed to methods and apparatus for implementing a communications system, e.g., an OFDM communications system, where it is important to transmit transmitter information, e.g., transmitter cell, sector and/or carrier frequency information, in addition to transmitting user data. In accordance with the present invention, narrowband, relatively high power tones are used to transmit transmitter information. These signals will be referred to herein as beacon signals. Beacon signals are transmitted using several times the transmission power used to transmit other signals, e.g. user data, communications segment assignment information, etc. In accordance with some embodiments of the present invention, beacon signals differ in per-tone power from non-beacon signals by at least a multiple of the per tone power level of the signal transmitted with the next highest transmission power level. That is, beacon signals in accordance with the present invention are transmitted with N times the power of the next highest power signal that is transmitted by the transmitter used to transmit the beacon signals, where N may be at least 10, 20, 30, 40 or more.

By maintaining a relative difference in average per tone signal energy of user data and/or other control signals to the average per tone energy of a beacon signal, e.g., a difference of 20, 30, 40 or more times, the probability that a beacon signal which is the transmitted as the higher power signal can be detected reliably will be several times the probability of the data or other control signals being detected. This approach provides a high probability of beacon signal detection while avoiding having to put all or 80% or more of the available transmission power into a beacon signal. The transmission power that is not put into the beacon signal can, and in various embodiments is, used to transmit user data in parallel with the beacon signal. Thus, user data may receive more than 20% and sometimes more than even 40% or 60%, of a transmitter's maximum possible transmission power during a period, e.g., single symbol transmission period, in which a beacon signal, e.g., beacon tone, is transmitted in accordance with the invention.

In accordance with the present invention, each base station sector transmitter transmits signals using a plurality of tones in parallel, e.g., over 10 but sometimes over 20, 100, 1000, or even more tones in parallel. In some embodiments the tones are evenly spaced within the frequency band used by the particular base station sector transmitter. As discussed above, concentrating more power on a tone used to transmit a beacon signal than other tones, e.g., used to transmit user data or other information, transmitting all or the majority of a base station sector's transmission power on one or more tones which comprise a beacon signal during a single transmission period, e.g., an OFDM symbol transmission period, can be wasteful. The various methods of the invention address this problem by using novel power allocations to beacon signals designed to use power efficiently while providing a high probability of detection.

In accordance with the present invention, in some embodiments less than 80% of the transmitter's total available transmission power is put into a beacon signal. In some embodiments of this type, user data is transmitted at the same time as the beacon signal, e.g., using different tones, with more than 20% of the total maximum possible transmission power being allocated to the user data during the transmission of the beacon signal. The beacon signal can be transmitted into the same or a different frequency band from the user data which is transmitted at the same time as the beacon signal. The maximum possible transmission power may correspond to a physical limitation of the transmitter or a set maximum amount of power the transmitter is permitted to use.

Thus, to make efficient use of the available bandwidth and available transmission power, in accordance with the present invention, in some but not all embodiments during transmission time periods in which a beacon signal is transmitted, more than 20% of the transmitter's power, and in many cases more than 30%, 40%, 50%, 60% and even sometimes more than 70% of the transmitters total transmission power is allocated to the transmission of user data while one or more tones corresponding to a beacon signal are transmitted. In such a case, where a large number of tones are used, the beacon tone power may still be several times, e.g., 20, 30, 40 or more times the maximum average per tone energy of data tones which occurs in a time period, e.g., a one second time period, which can occur anywhere in a larger 2 second transmission time period, e.g., where the beacon tone may be transmitted in the 2 second time period.

Such a power allocation to the communication of user data, e.g., voice, text or image data, can be achieved, while meeting the comparatively high transmission power level requirements of a beacon signal, by limiting the number of beacon signals to a relatively small number during any one symbol transmission time period, e.g., to less than $\frac{1}{5}$ or even less than $\frac{1}{20}^{th}$ the number of tones used during a symbol transmission time period. Such an approach is particularly useful in systems which use a large number of tones, e.g., over 100, 500 or even 1000 tones in parallel, e.g., during each symbol transmission time period. In some OFDM embodiments of this type, some user data is transmitted in the form of modulated symbols on tones which are not used to transmit a beacon signal during the time period in which a beacon signal is transmitted.

Given that the beacon signals are transmitted with relatively high power level, they can be detected using relatively simple to implement energy detection methods even in the case where precise timing and tone synchronization is not maintained between the transmitter of the beacon signal and the receiver of the beacon signal. Accurate detection of transmitted user data, given the lower power level at which it is transmitted, may and often does involve a receiver achieving symbol timing synchronization with the transmitter in terms of symbol timing.

In various embodiments, the beacon signal is used to communicate transmitter information such as a cell identifier, sector identifier and/or information about a frequency band associated with the transmitter which transmitted the detected beacon signal. Such information is communicated, in most embodiments, by the beacon signal without the need for beacon signal phase to be taken into consideration.

In some, but not all embodiments, a base station transmitter, e.g., a sector transmitter of a base station transmits a signal in a first period of time, e.g., an OFDM symbol transmission time period, that includes a plurality of signal tones where each signal tone corresponds to a different frequency. In one such embodiment, the transmitted signal includes a beacon signal transmitted on at least one tone and a user data signal transmitted in parallel, e.g., at the same time, with said beacon signal on tones which are not used to transmit said beacon signal. In various embodiments where this method is used the user data is transmitted by the transmitter with an average per tone power less than $\frac{1}{20}$ of the transmission power of each tone used to transmit the beacon signal. The beacon signal may be transmitted into the same frequency band as the band used by the transmitter to communicate user data, e.g., text, voice, or images, or into a frequency band used by a transmitter of a neighboring sector or cell for transmitting user data.

In some embodiments, a method of operating a base station is performed where the method includes the steps of: transmitting first signals into a first region using a set of N tones to communicate information over a first period of time, said first period of time being at least two seconds long, where N is larger than 10 (and in some cases more than 20, 100 or 1000); and transmitting during a second period of time a second signal including a set of X tones into said first region, where X is less than 5 (and where X in some cases is one), and where less than 80% (and in some embodiments less than 60%) of a maximum average total base station transmission power used by said base station transmitter to transmit signals into the first region during any 1 second period during said first period of time is allocated to said set of X tones and each one of said X tones to which power is allocated receives at least 20 times (and sometimes at least 30 or 40 times) the per tone average power allocated to tones during said any one second period.

Various embodiments of the present invention are also directed to a base station which implements the above described invention. In some exemplary embodiments a base station includes: a transmitter that uses a set of N tones to communicate information into a first region, where N is larger than 10 (and in some cases larger than 20, 99, 1000); a first control module coupled to said transmitter, for controlling the transmitter to transmit over a first period of time using first signals into the first region, said first period of time being at least two seconds long; and a second control module coupled to said transmitter for controlling the transmitter to transmit during a second period of time a second signal including a set of X tones into said first region, where X is a positive integer less than 5 (and in some embodiments 1), and where less than 80% of a maximum average total base station transmission power used by said base station transmitter to transmit into the first region during any 1 second period during said first period of time is allocated to said set of X tones and where each one of said X tones to which power is allocated is at least 20 times(and sometimes at least 30 or 40 times) the per tone maximum average power allocated to tones during any one second time period in said first time period.

In some embodiments, user data is allocated and transmitted using more than 20%, and in some cases more than 40 or even 60%, of a transmitter's maximum transmission power while transmitting a beacon signal. For example, a sector transmitter may put 40% of its maximum output transmission power which is permitted to be transmitted during a symbol transmission period. During the same transmission period a beacon signal may be transmitted on a tone with the beacon tone being transmitted at more than 20, or in some cases more than 40 or 60 times the power level of the user data.

The methods and apparatus are well suited to OFDM implementations where multiple modulated symbols, one per tone, are transmitted in parallel during an OFDM symbol period. In such embodiments, beacon signals may be transmitted in parallel with the tones used to transmit data symbols.

DETAILED DESCRIPTION

Figure 1:
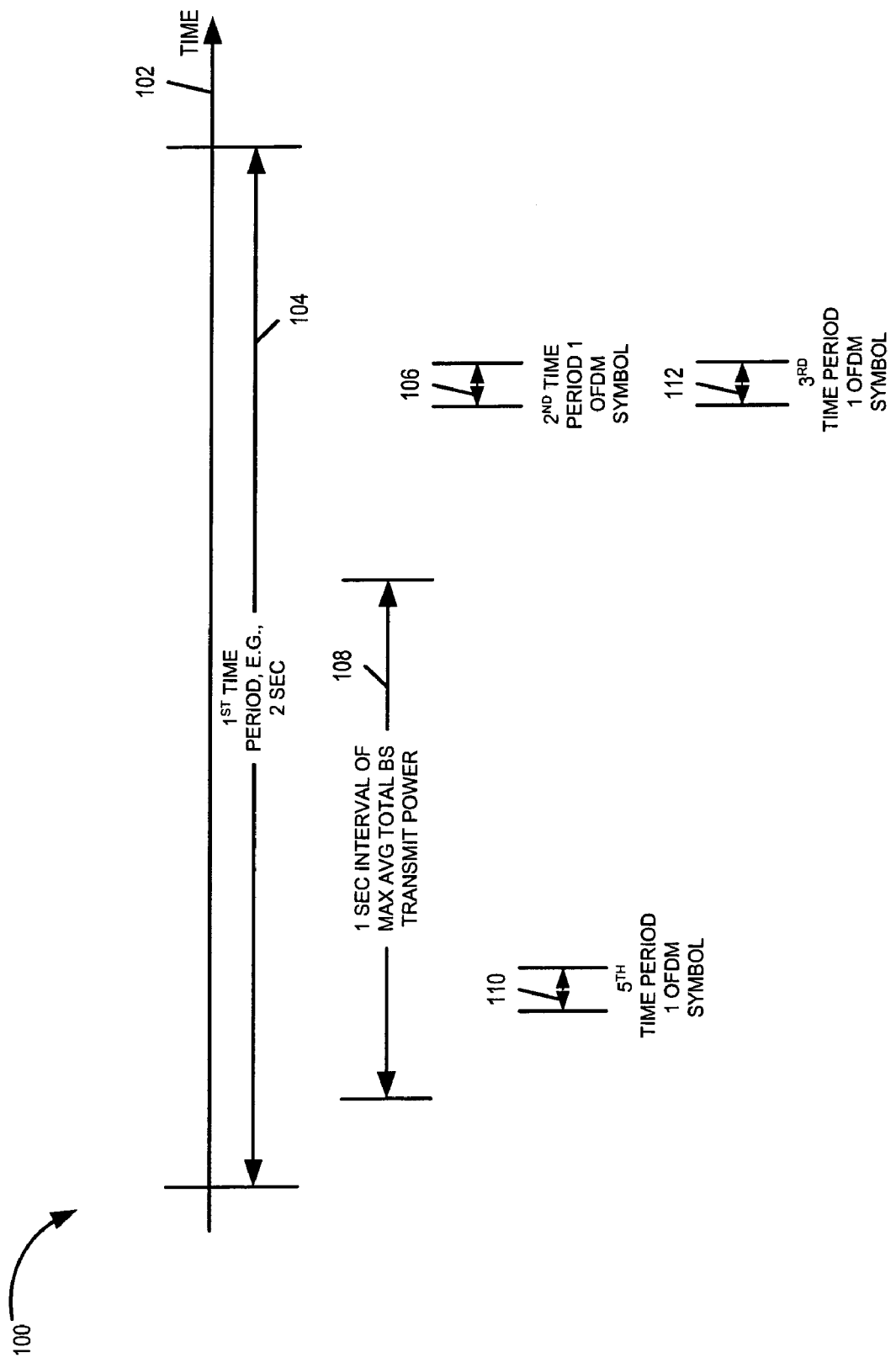
FIG. 1 is a drawing illustrating exemplary base station transmitter timing relationships in accordance with methods of the present invention.

FIG. 1 is a drawing 100 illustrating exemplary base station transmitter timing relationships in accordance with methods of the present invention. FIG. 1 includes a horizontal axis 102 representing time and a first period of time 104, e.g., a 2 sec interval. In some embodiments, the $1^{st}$ period of time 104 is larger than 2 seconds.

The exemplary base station transmitter, e.g., an OFDM signal sector transmitter, in an exemplary frequency division multiplexed communications system, e.g., an exemplary OFDM system, is operated to communicate information using a set of N tones over the first period of time 104 using first signals into a first region, e.g., a sector of a cell, where N is greater than 20. In some embodiments, the transmitter is a sector transmitter corresponding to one carrier frequency in a sector of a cell which uses multiple carrier frequencies.

The set of N tones, e.g., 113 tones, may be a set of tones used for downlink signaling from the base station transmitter to wireless terminals, said downlink signaling including broadcast signals including beacon signals and assignments, as well as user specific signals, e.g., user specific downlink traffic channel signals including user data. During an exemplary second period of time 106, e.g., an OFDM symbol transmission period, the transmitter is operated to transmit a second signal including a set of X tones into said first region, where X is less than 5 and where less than 80% of a maximum average total base station transmission power used by said base station to transmit signals into the first region during any one second period during said first period of time is allocated to set of X tones and each one of said X tones to which power is allocated is allocated at least 20 times the per average tone power allocated to tones during said first period of time. For example, the set of X tones during the second period of time 106 may comprise a beacon signal, and the second period of time may be an OFDM transmission time interval in a sequence of successive OFDM transmission time intervals which has been designated for beacon signals. In some embodiments, user data including at least one of voice, text and image data is communicated on at least one of the N tones transmitted during said first period of time 104, and transmitter information including at least one of sector, cell and carrier frequency information is transmitted on at least one of said X tones during said second period of time 106. An exemplary 1 sec interval 108 of maximum average total BS transmission power used by said base station transmitter to transmit signals into the first region is shown in FIG. 1. In general, the one second interval 108 of maximum power may slide or occur at different locations within the first period of time 104. FIG. 1 includes an exemplary fifth period of time 110, e.g., an exemplary OFDM symbol transmission time interval during the 1 second interval 108.

FIG. 1 also includes an exemplary third period of time 112, e.g. an exemplary OFDM symbol transmission interval. During the third period of time, the transmitter is operated to transmit a third signal into said first region including a set of Y tones, where $Y \leq N$, each tone in said third set of tones to which power is allocated is allocated at most 8 times the average per tone power allocated to tones during said 1 second interval of time 108. In FIG. 1, the third period of time 112 has the same duration as the second period of time 106, e.g., an OFDM symbol transmission time interval. In some embodiments, the second and third periods of time (106, 112) overlap. In the example of FIG. 1, the second and third periods of time (106, 112) fully overlap. In some embodiments, the second and third periods of time (106, 112) are disjoint. In various embodiments, the transmitter is operated to modulate at least two of data control, and pilot signals on at least some of said set of Y tones during the third period of time.

In some embodiments, the transmitter is operated to transmit user data using Y tones during said second period of time, said Y tones being within the set of N tones that are not included in said X tones, where Y is a positive integer greater than one, more than 20% of the total transmitter power used during said second period of time 106 being allocated to the Y tones during said second period of time 106. In some embodiments, more than 50% of the total transmitter power used during said second period of time 106 being allocated to the Y tones. In various embodiments, transmitting user data includes transmitting modulated symbols on said Y tones, each of the Y tone tones communicating one symbol one symbol, e.g., one OFDM modulation symbol in one OFDM symbol transmission interval.

In some embodiments, an exemplary fourth time period also occurs during the $1^{st}$ period of time 104, the fourth time period having the same duration as the $2^{nd}$ time period and being non-overlapping with respect to the $2^{nd}$ time period. For example, the fourth time period can be an interval used to transmit another beacon signal on a set of G tones, the beacon signal transmitted in the fourth time period being different than the beacon signal transmitted in the $2^{nd}$ time period.

Note that FIG. 1 is not drawn to scale. For example, the duration of an OFDM symbol transmission interval is significantly smaller than shown, e.g., each OFDM symbol transmission interval, in some embodiments, being 10 micro-sec in duration.

Figure 2:
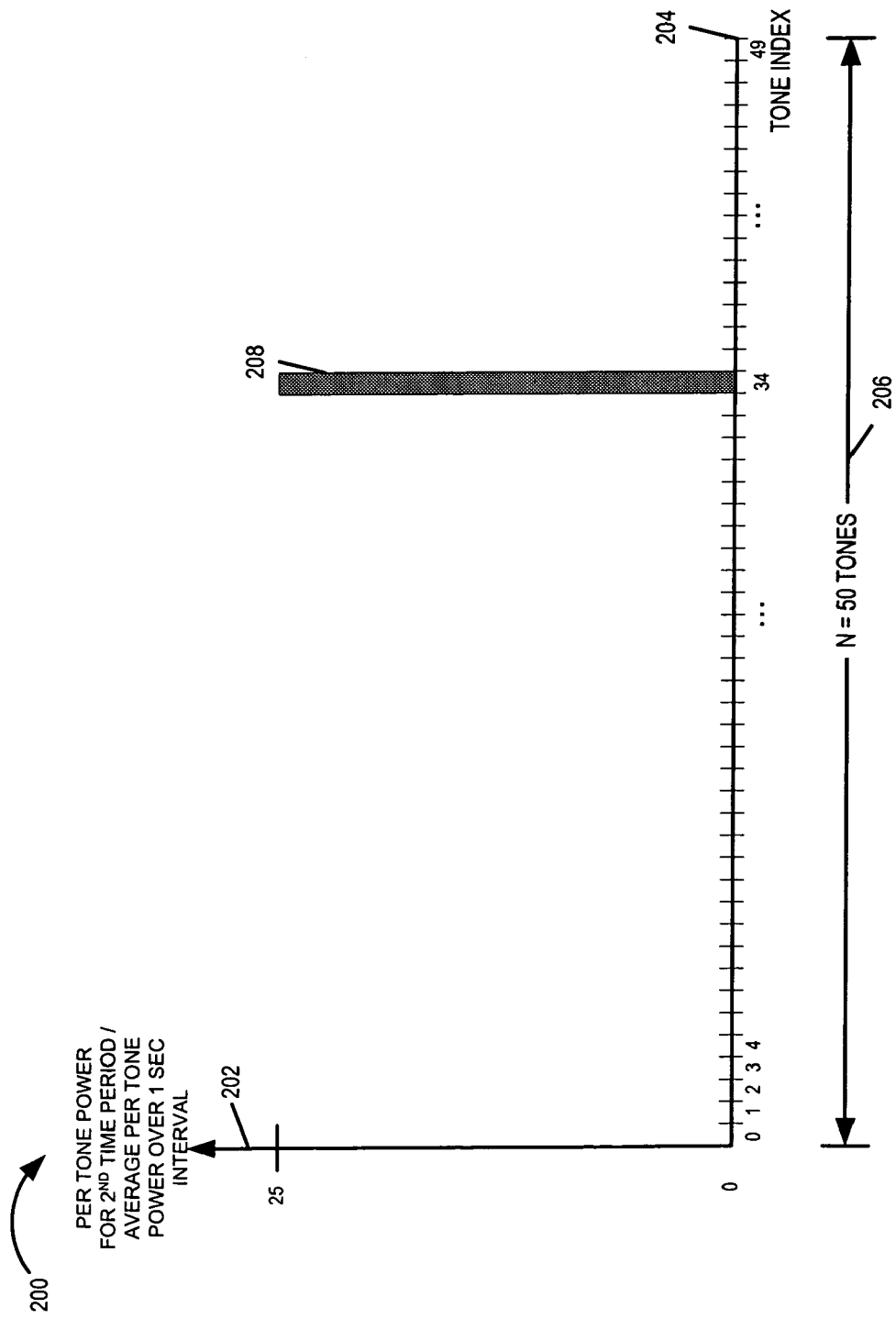
FIG. 2 is a drawing illustrating exemplary per tone power relationships in an exemplary $2^{nd}$ time interval.

FIG. 2 is a drawing 200 illustrating exemplary per tone power relationships in an exemplary $2^{nd}$ time interval 106. FIG. 2 is a plot of per tone power for $2^{nd}$ time period 106 divided by average per tone power over one second interval 108 on vertical axis 202 vs tone index on horizontal axis 204. The exemplary system corresponding to FIG. 2, uses N=50 tones (tone index 0 . . . 49) 206 for downlink signaling. The exemplary beacon signal 208 uses one tone with tone index 34 and 25 times the average per tone power over the one second interval. Thus, in this example, the tone set X includes one tone. In some embodiments, the tone set X includes two tones. This relatively high concentration of power on a narrow frequency, as shown in FIG. 2, makes the beacon signal 208 easy to detect and identify by WTs receiving downlink signaling.

Figure 3:
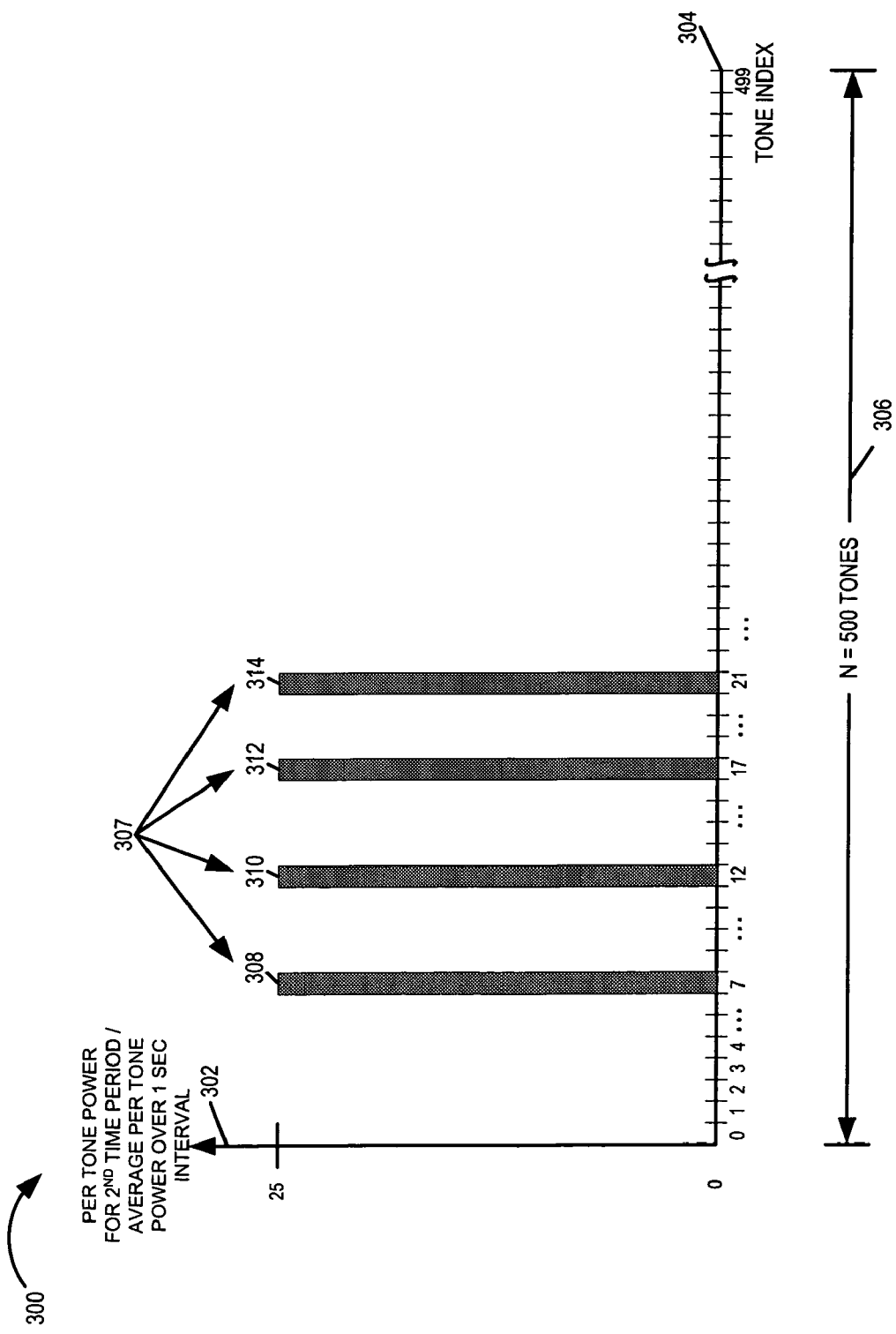
FIG. 3 is a drawing illustrating another exemplary per tone power relationships in an exemplary $2^{nd}$ time interval.

FIG. 3 is a drawing 300 illustrating another exemplary per tone power relationships in an exemplary $2^{nd}$ time interval 106. FIG. 3 is a plot of per tone power for $2^{nd}$ time period 106 divided by average per tone power over one second interval 108 on vertical axis 302 vs tone index on horizontal axis 304. The exemplary system corresponding to FIG. 3, uses N=500 tones (tone index 0 . . . 499) 306 for downlink signaling. The exemplary beacon signal 307 transmitted during second time period 106 uses four tones with tone index values (7, 12, 17, 21) and 25 times the average per tone power over the one second interval for each tone, as represented by blocks (308, 310, 312, and 314), respectively.

In some embodiments, at least one said X tones, e.g., beacon tones, is transmitted at predetermined frequency, and at least one of said X tones is transmitted using a frequency having a fixed frequency offset $\geq 0$ from the lowest frequency tone in said set of N tones. For example, a carrier beacon signal may use such X tones. In some embodiments, at least one of said X tones is transmitted at a frequency which is determined as a function of at least one of a base station identifier and a sector identifier.

In the example of FIG. 2 the exemplary second signal, e.g., beacon signal, using the set of X tones, where X=1, is transmitted using 50% of the max average total base station transmission power used by said base station transmitter to transmit signals into the first region during the 1 sec interval 108. In the example of FIG. 3 the exemplary second signal, e.g., beacon signal, using the set of X tones, where X=4, is transmitted using 20% of the max average total base station transmission power used by said base station transmitter to transmit signals into the first region during the 1 sec interval 108.

Figure 4:
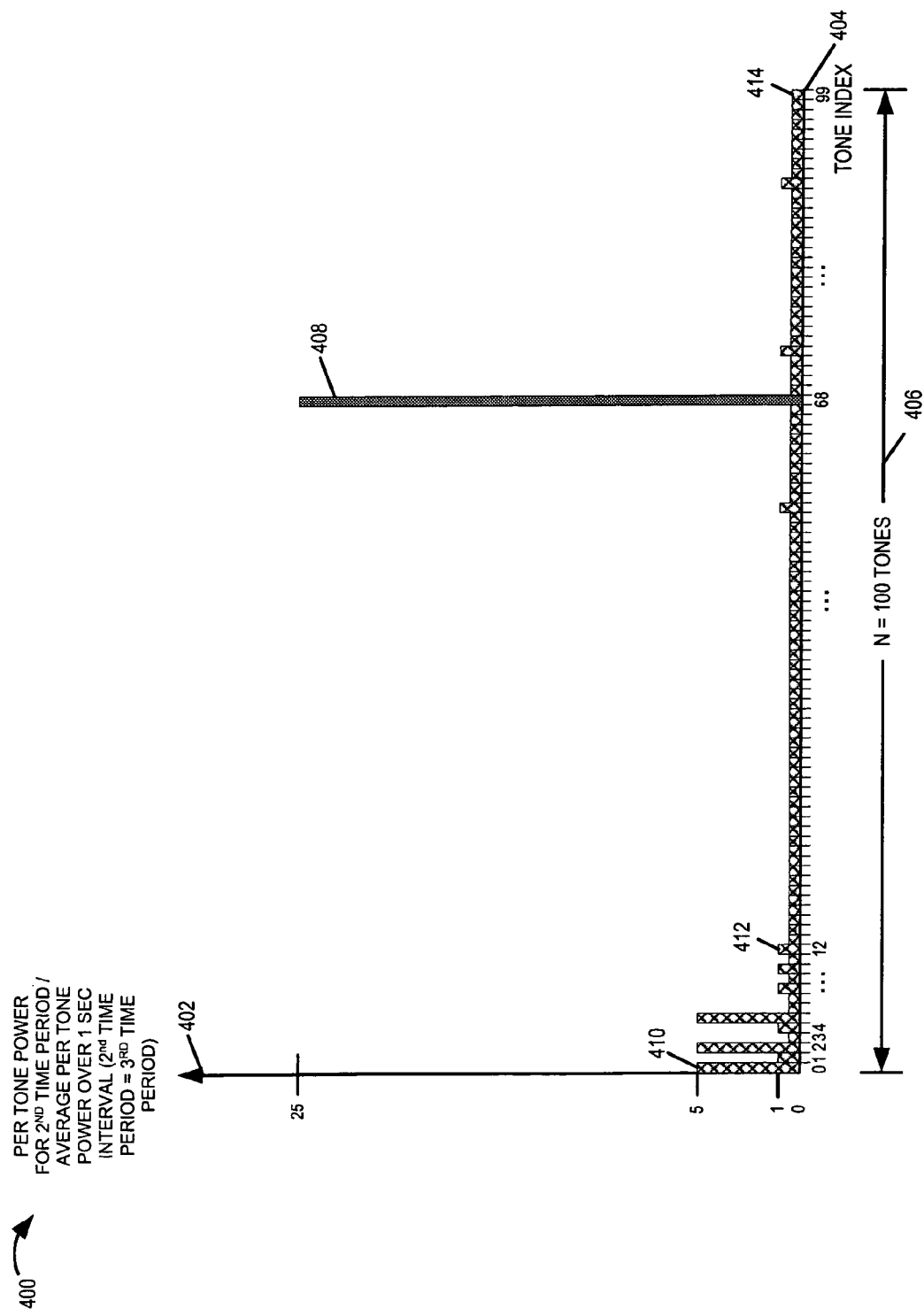
FIG. 4 is a drawing illustrating another exemplary per tone power relationships in an exemplary $2^{nd}$ time interval corresponds to an embodiment where the $2^{nd}$ time period and the third time period are fully overlapping.

In the examples of FIGS. 2 and 3, none of the N-X tones in said set of N tones are used during the second period of time 106, as transmitter power is concentrated on the beacon signal (X tones) and not on the other (N-X) tones during this time. FIG. 4 is a drawing 400 illustrating another exemplary per tone power relationships in an exemplary $2^{nd}$ time interval 106. FIG. 4 corresponds to an embodiment where the $2^{nd}$ time period 106 and the third time period 112 are fully overlapping. FIG. 4 is a plot of per tone power for $2^{nd}$ time period 106 divided by average per tone power over one second interval 108 on vertical axis 402 vs tone index on horizontal axis 404. In the FIG. 4 example, the $2^{nd}$ time period 106 is the same as the third time period 112. The exemplary system corresponding to FIG. 4, uses N=100 tones (tone index 0 . . . 99) 406 for downlink signaling. The exemplary beacon signal 408 transmitted during second time period 106 uses one tone with tone index=68 and 25 times the average per tone power over the one second interval for each tone. Thus, in this example, the tone set X, of the beacon signal 408, includes one tone. In FIG. 4 a set of Y tones, the set having 99 tones includes each of the tones in the set of N tones not in the set of X tones. Tones of the set of Y tones have 5 times, 1 time or 0.5 times the per tone power divided by the average per tone power over the 1 sec interval. For example exemplary signal 410 using tone 0 at the 5× relative power level may be part of a pilot signal, while exemplary signal 412 using tone 12 at the 1× relative power level may be part of a control signal such as an assignment, acknowledgement, timing control signal, or power control signal. Exemplary signal 414 using tone 99 at the 0.5× relative power level may be part of a downlink traffic channel signal conveying user data.

Figure 5:
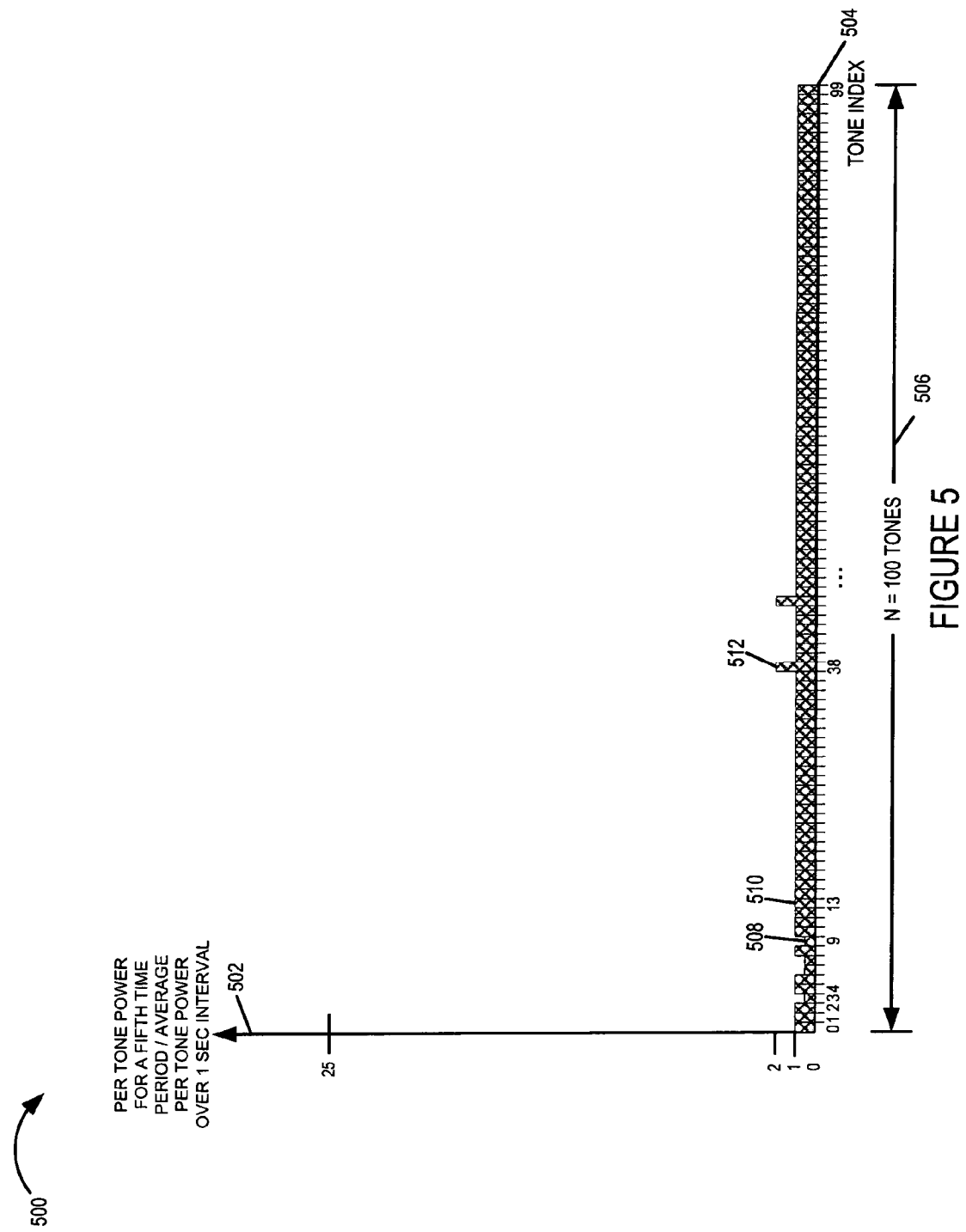
FIG. 5 is a drawing illustrating exemplary per tone power relationships in an exemplary $5^{th}$ time interval.

FIG. 5 is a drawing 500 illustrating exemplary per tone power relationships in an exemplary $5^{th}$ time interval 110. FIG. 5 is a plot of per tone power for $5^{th}$ time period 110 divided by average per tone power over one second interval 108 on vertical axis 502 vs tone index on horizontal axis 504. The exemplary system corresponding to FIG. 5, uses N=100 tones (tone index 0 . . . 99) 506 for downlink signaling. Tones shown in the example of FIG. 5 have 2×, 1× or 0.5× the per tone power divided by the average per tone power over the 1 sec interval. For example exemplary signal component 512 uses tone 38 at the 2× power level and may be part of a control signal such as a pilot signal, an assignment signal, an acknowledgement signal, a timing control signal or a power control signal; exemplary component 510 uses tone 13 at 1× power level and may be part of a user data signal, while exemplary component 508 at 0.5× power level uses tone 9 and may be part of another user data signal. During exemplary $5^{th}$ interval 110 shown, the total transmission power is 100% the average transmission power during the 1 sec interval 108 of max average total BS transmit power into the first region. In the example of FIG. 5, there are two tones with signal components of type 512 representing 4% of the total power, ninety-four tones with signal components of type 510 representing 94% of the total power, and four tones with signal components of type 508 representing 2% of the total power. In general, the total power during each $5^{th}$ interval 110, e.g., each OFDM symbol transmission interval, will deviate from the average power of the 1 sec interval 108.

Figure 6:
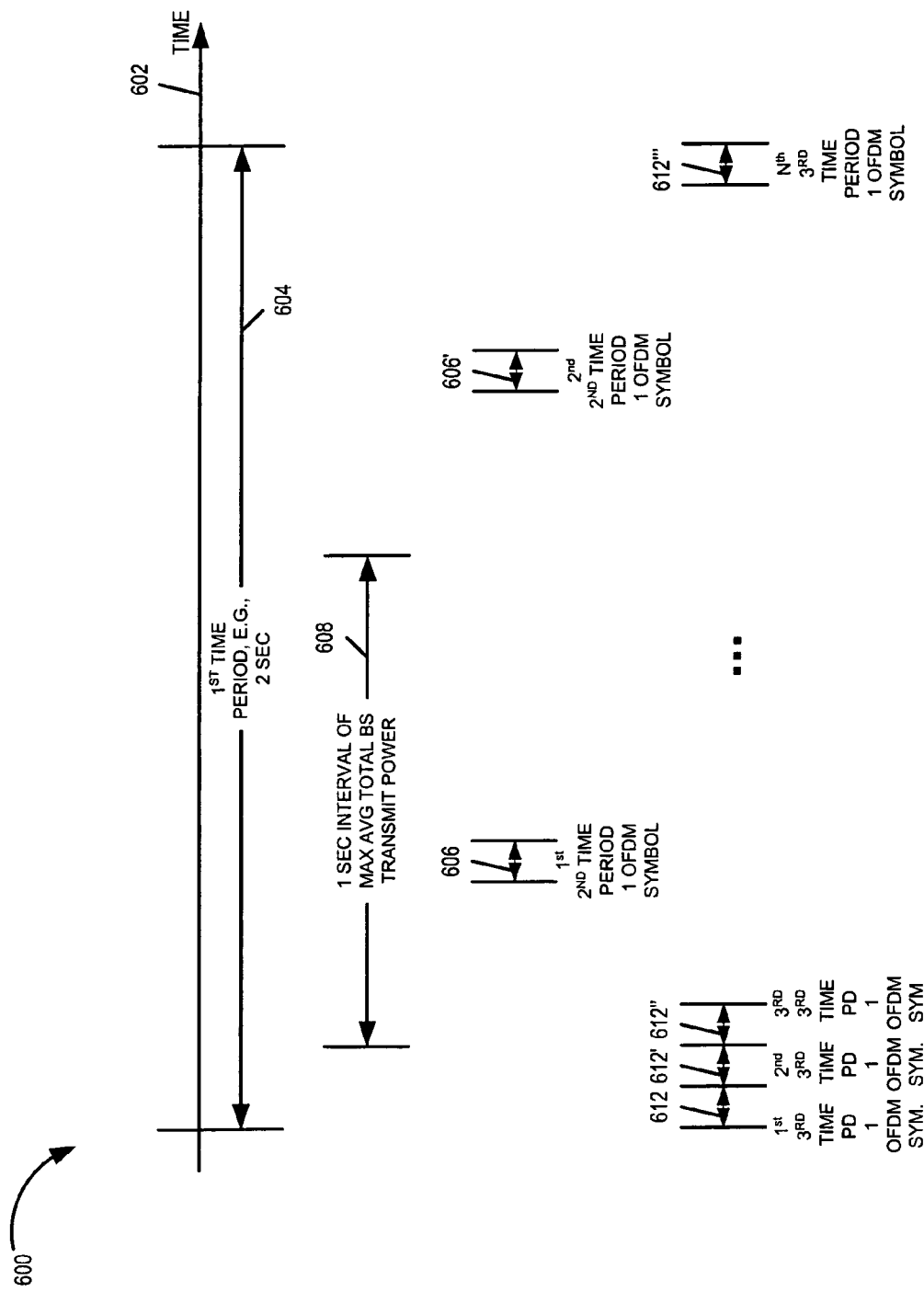
FIG. 6 is a drawing illustrating exemplary base station transmitter timing relationships in accordance with methods of the present invention.

FIG. 6 is a drawing 600 illustrating exemplary base station transmitter timing relationships in accordance with methods of the present invention. FIG. 6 shows an exemplary variation of FIG. 1 in accordance with the present invention. Exemplary first time period 604 of FIG. 6 is similar or the same as exemplary first time period 104 of FIG. 1. Exemplary one second interval 608 of maximum average total BS transmit power of FIG. 6 is similar or the same as interval 108 of FIG. 1. Exemplary second time periods (606, 606') of FIG. 6 are similar or the same as exemplary second time period 106 of FIG. 1. Exemplary $1^{st}$ $2^{nd}$ time period 606 and exemplary $2^{nd}$ $2^{nd}$ time period 606' illustrate that the second time period periodically repeats during the first time period 604. FIG. 6 includes repetitions of the $3^{rd}$ time period ($1^{st}$ $3^{rd}$ time period 612, $2^{nd}$ $1^{st}$ time period 612', $3^{rd}$ $1^{st}$ time period 612", . . . , Nth $3^{rd}$ time period 612''') within the first time period 604. Each $3^{rd}$ time period (612, 612', 612", 612''') is similar or the same as exemplary $3^{rd}$ time period 112 of FIG. 1. In some embodiments, for each repetition of said second time period there are at least Z repetitions of said $3^{rd}$ time period, where Z is at least 10. In some embodiments, Z is at least 400.

Figure 7:
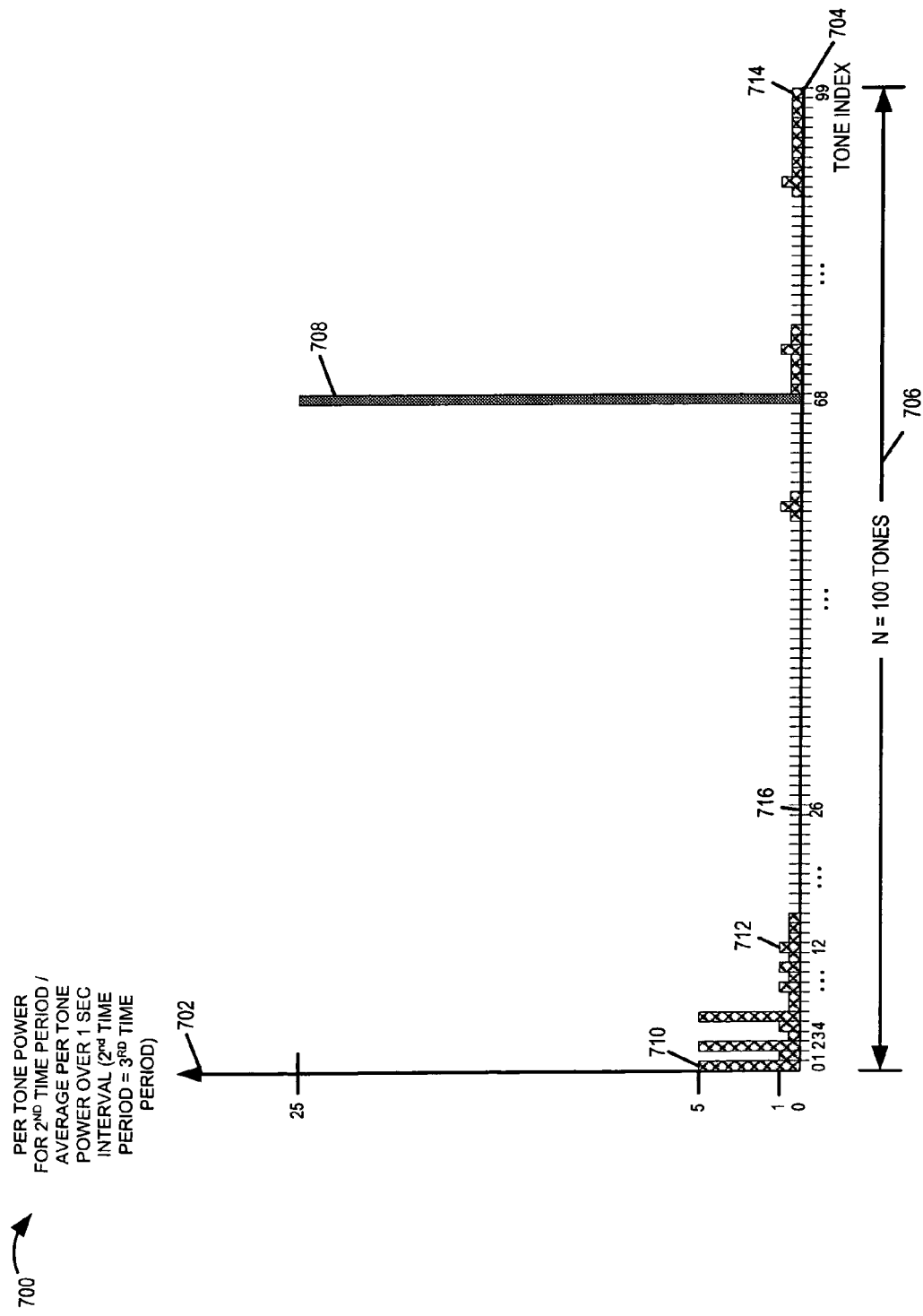
FIG. 7 is a drawing illustrating another exemplary per tone power relationships in an exemplary $2^{nd}$ time interval corresponding to an embodiment where the $2^{nd}$ time period and the third time period are fully overlapping.

FIG. 7 is a drawing 700 illustrating another exemplary per tone power relationships in an exemplary $2^{nd}$ time interval 106. FIG. 7 corresponds to an embodiment where the $2^{nd}$ time period 106 and the third time period 112 are fully overlapping. FIG. 7 is a plot of per tone power for $2^{nd}$ time period 106 divided by average per tone power over one second interval 108 on vertical axis 702 vs tone index on horizontal axis 704. In the FIG. 4 example, the $2^{nd}$ time period 106 is the same as the third time period 112. The exemplary system corresponding to FIG. 7, uses N=100 tones (tone index 0 . . . 99) 706 for downlink signaling. The exemplary beacon signal 708 transmitted during second time period 106 uses one tone with tone index=68 and 25 times the average per tone power over the one second interval for each tone. Thus, in this example, the tone set X, of the beacon signal 708, includes one tone. In FIG. 7 a set of Y tones, the set including 35 tones in the set of N tones not in the set of X tones. Tones of the set of Y tones have 5×, 1× or 0.5× the per tone power divided by the average per tone power over the 1 sec interval. For example, exemplary signal 710 using tone 0 at the 5× relative power level may be part of a pilot signal, while exemplary signal 712 using tone 12 at the 1× relative power level may be part of a control signal such as an assignment, acknowledgement, timing control signal, or power control signal. Exemplary signal 714 using tone 99 at the 0.5× relative power level may be part of a downlink traffic channel signal conveying user data. Exemplary tone 26 716 is an unused tone from the set of N tones. In this embodiment, 64 tones from the set of N-X=99 tones go unused during the second period of time 106 in the first region. In some embodiments, at least half of the N-X tones which are in said set of N tones but not in said set of X tones go unused during said second period of time in the first region.

Figure 8:
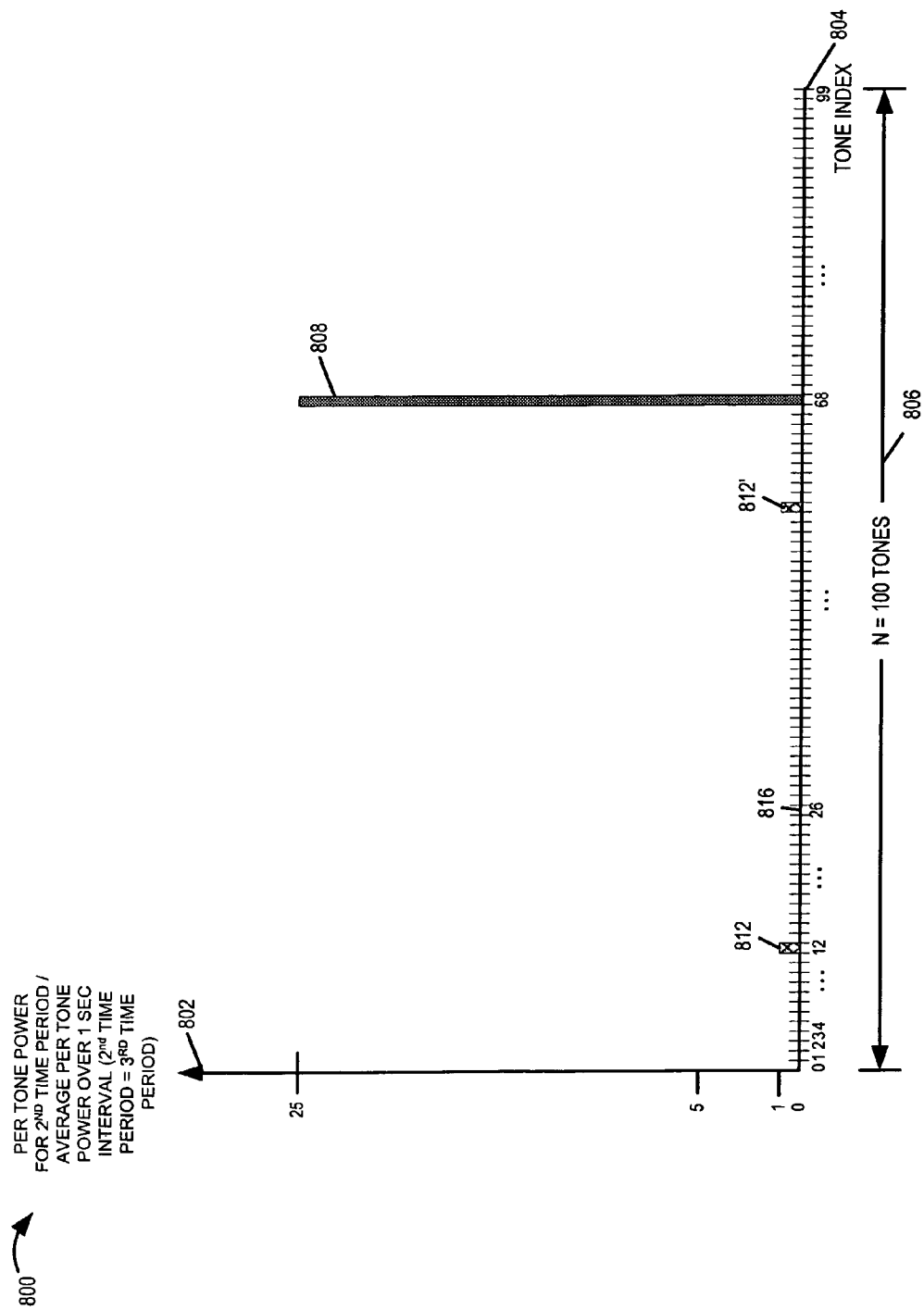
FIG. 8 is a drawing illustrating another exemplary per tone power relationships in an exemplary $2^{nd}$ time interval corresponding to an embodiment where the $2^{nd}$ time period and the third time period are fully overlapping.

FIG. 8 is a drawing 800 illustrating another exemplary per tone power relationships in an exemplary $2^{nd}$ time interval 106. FIG. 8 corresponds to an embodiment where the $2^{nd}$ time period 106 and the third time period 112 are fully overlapping. FIG. 8 is a plot of per tone power for $2^{nd}$ time period 106 divided by average per tone power over one second interval 108 on vertical axis 802 vs tone index on horizontal axis 804. In the FIG. 8 example, the $2^{nd}$ time period 106 is the same as the third time period 112. The exemplary system corresponding to FIG. 8, uses N=100 tones (tone index 0 . . . 99) 806 for downlink signaling. The exemplary beacon signal 808 transmitted during second time period 106 uses one tone with tone index=68 and 25 times the average per tone power over the one second interval for each tone. Thus, in this example, the tone set X, of the beacon signal 808, includes one tone. In FIG. 8 a set of Y tones, the set including 2 tones (tone index=12 and tone index=26) in the set of N tones not in the set of X tones, are associated with signal components (812, 812'), respectively. In this example, tones of the set of Y tones have 1× the per tone power divided by the average per tone power over the 1 sec interval. For example exemplary signal 812 using tone 12 at the 1× relative power level may be part of a control signal such as a pilot, an assignment, acknowledgement, timing control signal, or power control signal or part of a user data signal such as a signal including voice, text, and/or user application data. Exemplary tone 26 816 is an unused tone from the set of N tones. In this embodiment, 97 tones from the set of N-X=99 tones go unused during the second period of time 106 in the first region. In some embodiments, multiple ones of the N-X tones in the set of N tones but not in the set of X tones are used during said second period of time in the first region.

Figure 9:
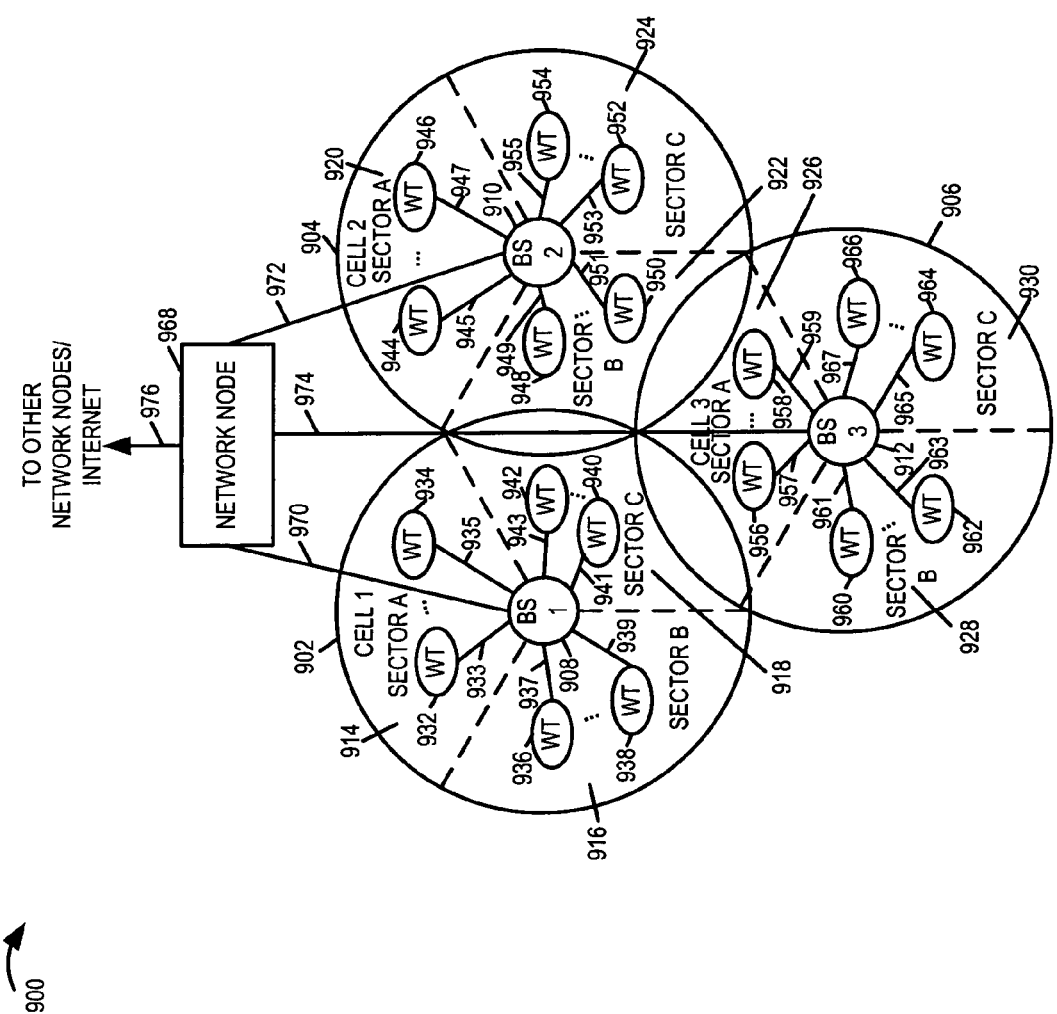
FIG. 9 shows an exemplary wireless communications system, supporting beacon signaling, implemented in accordance with the present invention.

FIG. 9 shows an exemplary wireless communications system 900, supporting beacon signaling, implemented in accordance with the present invention. The system 900 uses apparatus and methods of the present invention. FIG. 9 includes a plurality of exemplary multi-sector cells, cell 1 902, cell 2 904, cell 3 906. Each cell (902, 904, 906) represents a wireless coverage area for a base station (BS), (BS1 908, BS2 910, BS 3 912), respectively. In the exemplary embodiment, each cell 902, 904, 906 includes three sectors (A, B, C). Cell 1 902 includes sector A 914, sector B 916, and sector C 918. Cell 2 904 includes sector A 920, sector B 922, and sector C 924. Cell 3 906 includes sector A 926, sector B 928, and sector C 930. In other embodiments, different numbers of sectors per cell are possible, e.g., 1 sector per cell, 2 sectors per cell, or more than 3 sectors per cell. In addition, different cells may include different numbers of sectors.

Wireless terminals (WTs), e.g., mobile nodes (MNs), may move throughout the system and communicate with peer nodes, e.g., other MNs, via wireless links to BSs. In cell 1 902 sector A 914, WTs (932, 934) are coupled to BS 1 908 via wireless links (933, 935), respectively. In cell 1 902 sector B 916, WTs (936, 938) are coupled to BS 1 908 via wireless links (937, 939), respectively. In cell 1 902 sector C 918, WTs (940, 942) are coupled to BS 1 908 via wireless links (941, 943), respectively. In cell 2 904 sector A 920, WTs (944, 946) are coupled to BS 2 910 via wireless links (945, 947), respectively. In cell 2 904 sector B 922, WTs (948, 950) are coupled to BS 2 910 via wireless links (949, 951), respectively. In cell 2 904 sector C 924, WTs (952, 954) are coupled to BS 2 910 via wireless links (953, 955), respectively.

BSs may be coupled together via a network, thus providing connectivity for WTs within a given cell to peers located outside the given cell. In system 900, BSs (908, 910, 912) are coupled to network node 968 via network links (970, 972, 974), respectively. Network node 968, e.g., a router, is coupled to other network nodes, e.g., other base stations, routers, home agent nodes, AAA server nodes, etc., and the Internet via network link 976. Networks links 970, 972, 974, 976 may be, e.g., fiber optic links.

BSs 908, 910, 912 include sectorized transmitters, each sector transmitter using a specific assigned carrier frequency for ordinary signaling e.g., downlink traffic signals such as user data directed to specific WT(s), in accordance with the invention. The sector transmitter's assigned carrier frequency used for ordinary signaling also conveys broadcast signals such as, e.g., assignment signals, pilot signals, and/or beacon signals, from the BS to WTs. BSs 908, 910, 910 transmit beacon signals conveying carrier information, cell identification information and/or sector identification information. In addition, in accordance with some embodiments of the invention, each base station sector transmitter transmits additional downlink signals such as, e.g., pilot signals and/or beacon signals within the carrier frequency bands assigned to adjacent cell/sector transmitters for their ordinary signaling. Such downlink signals provide information to the WTs, e.g., WT 932, which may be used to evaluate and decide which carrier frequency to select and which corresponding base station sector/cell to use as an attachment point. The WTs, e.g., WT 932, include receivers with the capability to process information from BSs 908, 910, 912 sector transmitters providing information on alternative carrier frequencies bands that may be used for ordinary communications, e.g., downlink traffic channel signaling, and that may be selected by the WT.

Figure 10:
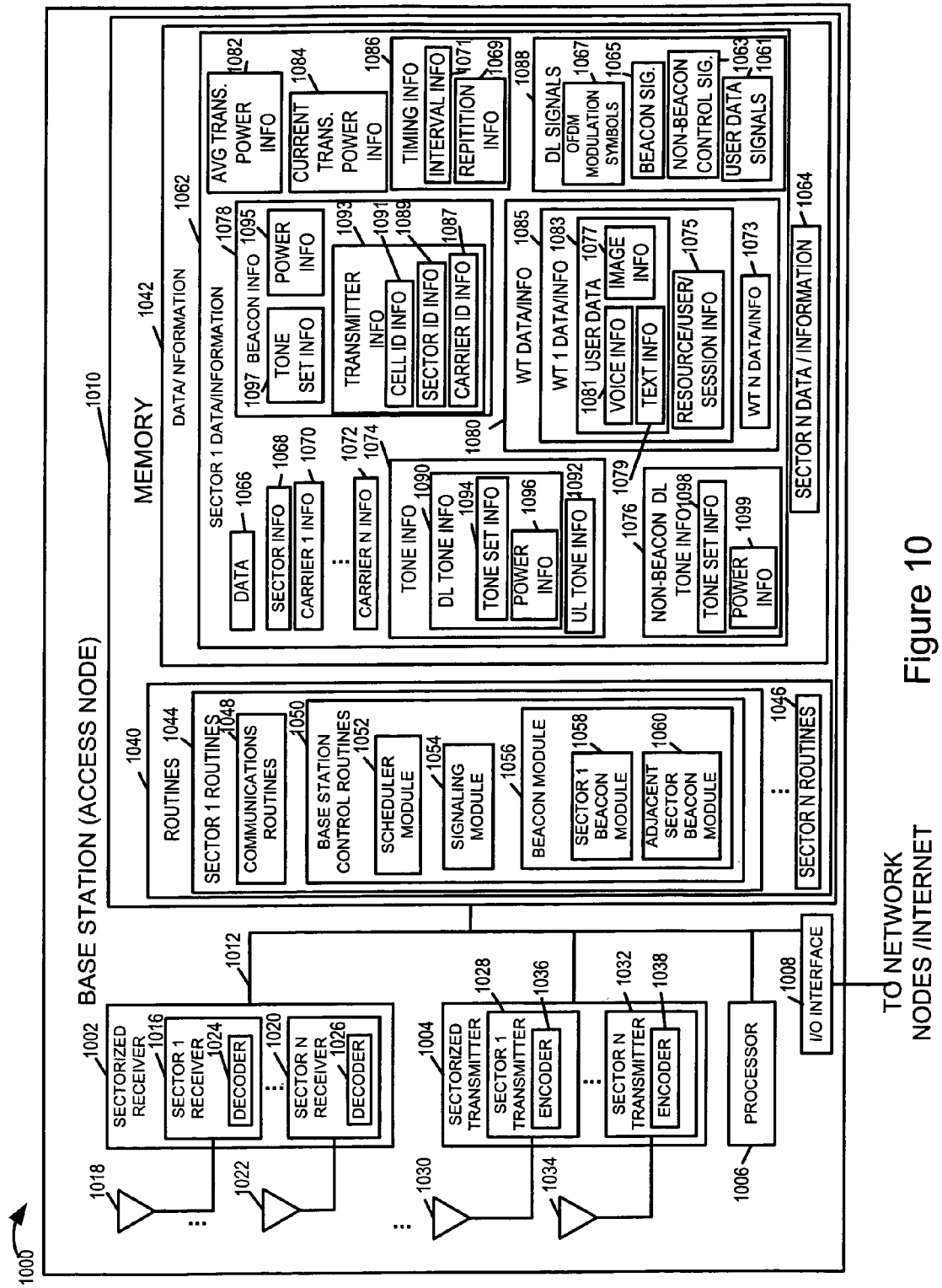
FIG. 10 illustrates an exemplary base station, alternately referred to as an access node, implemented in accordance with the present invention.

FIG. 10 illustrates an exemplary base station 1000, alternately referred to as an access node, implemented in accordance with the present invention. The BS is called an access node because it serves as a WT's point of network attachment and provides the WT access to the network. The base station 1000 of FIG. 10 may be a more detailed representation of any of the base stations 908, 910, 912 of the system 900 of FIG. 9. The base station 1000 includes a sectorized receiver 1002, a sectorized transmitter 1004, a processor 1006, e.g., a CPU, an I/O interface 1008, and a memory 1010 coupled together via a bus 1012 over which the various elements may interchange data and information. The sectorized receiver 1002 includes a plurality of receivers (sector 1 receiver 1016, sector N receiver 1020), each receiver coupled to a receive antenna (receive antenna 1 1018, receive antenna N 1022), respectively. Each receiver (1016, 1020) includes a decoder (1024, 1026), respectively. Uplink signals from a plurality of wireless terminals 1100 (See FIG. 11) are received via sectorized antenna (1018, 1022) and processed by sectorized receivers (1016, 1020). Each receiver's decoder (1024, 1026) decodes received uplink signals and extracts the information encoded by the WTs 1100 prior to transmission. The sectorized transmitter 1004 includes a plurality of transmitters, a sector 1 transmitter 1028, a sector N transmitter 1030. Each sector transmitter (1028, 1030) includes an encoder (1036, 1038), for encoding downlink data/information, and is coupled to a sector transmit antenna (1030, 1034), respectively. Each antenna 1030, 1034 corresponds to a different sector and is normally oriented to transmit into the sector to which the antenna corresponds and may be located. Antennas 1030, 1034 may be separate or may correspond to different elements of a single multi-sector antenna which has different antenna elements for different sectors. Each sector transmitter (1030, 1034) has an assigned carrier frequency band to be used for ordinary signaling, e.g., downlink traffic signaling. Each sector transmitter (1030, 1034) is capable of transmitting downlink signals, e.g., assignment signals, data and control signals, pilot signals, and/or beacon signals in its own assigned carrier frequency band. Each sector transmitter (1030, 1034), in accordance with some embodiments of the invention, also transmits additional downlink signals, e.g., pilot signals and/or beacon signals into other carrier frequency bands, e.g., the carrier frequency bands assigned to adjacent cells/sectors for their ordinary signaling. The base station I/O interface 1008 couples the base station 1000 to other network nodes, e.g., other access nodes, routers, AAA servers, home agent nodes, and the Internet. The memory 1010 includes routines 1040 and data/information 1042. The processor 1006 executes routines 1040 and uses the data/information 1042 in the memory 1010 to control the operation of the base station 1000 including scheduling users on different carrier frequencies using different power levels, power control, timing control, communication, signaling, and beacon signaling in accordance with the invention.

Routines 1040 includes a plurality of set of routines (sector 1 routines 1044, sector N routines 1046), each set corresponding to a sector covered by the BS 1000. In some embodiments, e.g., embodiments where multiple carrier frequencies are used for ordinary signaling, e.g., downlink traffic channel signaling including user data, in a single sector, additional sets of routines may exist for the sector corresponding to the different carriers corresponding to different BS sector attachment points.

Exemplary sector 1 routines 1044 include communications routines 1048 and base station control routines 1050. Communications routines 1048 perform the various communications protocols used by the BS 1000. Base station control routines 1050 uses the data/information 1042 to control the operations of the BS 1000 including operation of sector 1 receiver 1016, operation of sector 1 transmitter 1028, operation of I/O interface 1008, and implementation of methods of the present invention including beacon signaling. Scheduler module 1052 schedules users, e.g., assigning air link resources such as uplink and downlink traffic channel segments to WTs. Signaling module 1054 uses the data/information 1042 in memory 1010 to perform control of the downlink and uplink signaling in regard to sector 1 signaling. Signaling module 1054 controls sector 1 transmitter 1028 to transmit over periods of time, e.g., intervals 2 sec or longer, using downlink signals into the first sector of the cell corresponding to BS 1000. Some of the downlink signals transmitted include downlink traffic channel signals including user data such as voice, text, and/or image information, pilot signals and other control information such as assignments, acknowledgement, timing control and power control information. Signaling module 1054 uses the sets of tones assigned to the BS 1000 including a set of N downlink tones, where N is larger than 20. Signaling module 1054 controls timing operations, e.g., OFDM symbol transmission timing operations and beacon activation timing control operations.

Beacon module 1056 includes a sector 1 beacon module 1058 and an adjacent sector beacon module 1060. Beacon module 1056 uses the data/information 1042 in memory 1010 to control the sector 1 transmitter beacon functions including beacon signal generation and transmission, in accordance with the present invention. Beacon module 1056 controls the sector 1 transmitter 1028 to transmit beacon signals during designated beacon signaling intervals, a beacon signal using a set of X tones where X is a positive number less than 5, and where the power allocated to the set of X tones of the beacon signal is less than 80% of a maximum average base station transmission power used by the base station to transmitter to transmit into sector 1 during any 1 second interval of time during a first designated time period of at least 2 seconds, the at least 2 second interval including the beacon signal, and where each one of said X tones to which power is allocated is at least 20 times the per tone average power allocated to tones during the any one second time period in the at least 2 sec long interval.

Sector 1 beacon module 1058 performs control operations related to beacons signals generated and transmitted within the carrier frequency band used by sector 1 transmitter 1028 for ordinary downlink signaling, e.g., downlink signaling including user data. Adjacent sector beacon module 1060 performs operation related to beacon signals generated and transmitted within the carrier frequency band used by adjacent sectors for transmitting ordinary downlink signaling. By transmitting beacon signals in adjacent bands, a WT with a single receiver chain tuned, to a single carrier, can receive beacon signals conveying information about different potential carrier frequency BS sector attachment points while still operating on its current attachment point carrier frequency.

Data/information 1042 includes a plurality of sets of data/information (sector 1 data/information 1062, sector N data/information 1064). Sector 1 data/information 1062 includes data 1066, sector information 1068, a plurality of sets of carrier information (carrier 1 information 1070, carrier N information 1072), tone information 1074, non-beacon downlink tone information 1076, beacon information 1078, WT data/information 1080, average transmitter power information 1082, current transmitter power information 1084, timing information 1086, and downlink signals 1088.

Data 1066 includes user data/information received from and user data/information to be transmitted to a plurality of WTs, e.g., WTs using sector 1 of BS 1000 as a network attachment point and WTs in a communications session with a WT using sector 1 of BS 1000 as a network attachment point. Sector information 1068 includes information identifying sector 1, e.g., specific BS sector identifiers.

Carrier information (carrier 1 info 1070 and carrier N info 1072) includes information associated with each of the carriers used in sector 1 for downlink signaling. In some embodiments, a given sector of a cell may use multiple carriers for user data downlink signaling with each of the multiple carriers corresponding to a different alternative network attachment point. In such an embodiment, each carrier within the sector may be associated with a different BS sector transmitter, and a given sector may have multiple BS sector transmitters, e.g., multiple sector 1 transmitters 1028.

In some embodiments, e.g., an embodiment using adjacent sector beacon module 1060, carrier information (1070, 1072) includes information identifying whether the carrier is the carrier used by transmitter 1028 in sector 1 for ordinary downlink signaling including user data, and beacon signals and other control signals or whether the carrier is the carrier used for user data downlink signaling by an adjacent sector in which case the sector 1 transmitter transmits beacon signals using the carrier but not user data.

Carrier information (1070, 1072) also includes information identifying bandwidth, e.g., about which the downlink carrier is centered. Carrier information (1070, 1072) includes information pertaining to downlink and/or uplink carriers used in sector 1. Downlink carrier information is used in tuning the sector 1 transmitter 1028, while uplink carrier information is used in tuning the sector 1 receiver 1016.

Tone information 1074 includes downlink tone information 1090 corresponding to downlink signaling and uplink tone information 1092 corresponding to uplink signaling with respect to sector 1 of BS 1000. Downlink tone information 1090 includes tone set information 1094 and power information 1096. Tone set information 1094 includes a set of N tones, where N is larger than 20, used by the sector 1 transmitter 1028 for downlink signaling including user data, beacon signals, pilot signals, and other control signals such as assignments, acknowledgements, timing control signals, and power control signals. In some embodiments, the set of N tones is a contiguous set of tones using the bandwidth allocated for downlink signaling for the sector 1 transmitter 1028.

In some embodiments, downlink tone information 1090 includes tone hopping information, where information is mapped to logical tones and the logical tones are hopped to physical tones over time according to a periodic predetermined tone hopping sequence which may be a function of the base station and/or base station sector. Power information 1096 includes power level information including total sector transmit power allocated to the set of N tones, power level information on a per tone basis, and/or power information on an average basis.

Uplink tone information 1092 includes information such as tone set information associated with the set of tones in the uplink band to which sector 1 receiver 1016 is tuned.

Beacon information 1078 includes tone set information 1097 power information 1095, and transmitter information 1093. Tone set information 1097 includes information on a set or sets of X tones from the set of N tones, X being less than 5, where each set of X tones comprises the tones of a beacon signal. Power information 1095 includes information identifying the power level to be used on each of the N tones of the beacon signal, where each one of X tones to which power is allocated is allocated at least 20× the per tone average power allocated to tones during any one second period of time in a first period of time of at least 2 seconds, the first period including the beacon signal; power information 1095 also includes information identifying the power level to be used on the combined set of X tones comprising the beacon signal, where the power is less than 80% of a maximum average total base station transmission power used by base station sector 1 transmitter 1028 during the any one second period of time.

Transmitter information 1093 includes cell identification information 1091, sector ID information 1089, and carrier identification information 1087. The various types of transmitter identification information in info 1093 may be conveyed by beacon signals, e.g., by the set of X tones associated with the beacon and the time at which the sector 1 transmitter 1028 transmits the beacon in a repeating sequence of beacon signals.

Non-beacon downlink tone information 1076 includes information on sets of Y tones, $Y \leq N$, which are used to transmit non-beacon downlink signals such as user data, pilot signals, and other control signals. During different time intervals, e.g., different OFDM symbol transmission intervals, the set of Y tones may change. For example, when the OFDM transmission time interval is an interval during which a beacon signal is not transmitted, the set of Y tones may include each of the N tones. In some embodiments, during a beacon transmission interval, the set of Y tones includes 0 tones. In other embodiments, during a beacon interval, a set of N-X tones exists, and a subset of Y tones from the set of N-X tones is used to transmit user data at the same time as the beacon signal transmission. In some embodiments, the set of Y tones during the beacon transmission interval is a set of greater than 50 tones. Power information 1099 includes information identifying the power allocated to the set of Y tones and to each of the tones in the set of Y tones. In some embodiments, more than 20% of the total sector transmitter power during a beacon transmission interval is allocated to the set of Y tones during that beacon interval. In some embodiments, more than 50% of the total sector transmitter power during a beacon transmission interval is allocated to the set of Y tones during that beacon interval.

WT data/information 1042 includes a plurality of sets of information (WT 1 data/info 1085, WT N data/info 1073). Each set of information, e.g., WT1 data/information 1085, may correspond to a WT using BS 1000 sector 1 as its network attachment point. WT 1 data/info 1085 includes user data 1083 in route from/to WT 1 and resource/user/session information 1075. User data 1083 includes voice information 1081, text information 1079, and image information 1077. Resource/user/session information 1075 includes information identifying resources allocated to WT1 such as a base station assigned identifier and allocated segments, e.g., dedicated uplink and downlink traffic channel segments. Resource/user/session information 1075 also includes information identifying users, e.g., other WTs, in communications sessions with WT1 and routing information associated with those other WTs.

Average transmission power information 1082 includes information of the sector 1 transmitter 1028 average transmission power, e.g., over a 1 sec intervals. Current transmission power information 1084 includes information on the transmission power of the sector 1 transmitter 1028 transmissions during the current OFDM symbol transmission interval including power levels of each of the tones used during the current OFDM symbol transmission interval. When the current OFDM symbol transmission interval is a beacon interval, the current transmission power information 1084 also includes information on the combined power on the set of tones comprising the beacon signal. The transmission power allocated to the tones is controlled in accordance with the methods of the invention, e.g., allocating a relatively high level of power on a per tone basis to beacon tones, in comparison to the level of power on a per tone basis allocated to user data or other non-beacon control signals.

Timing information 1086 includes interval information 1071 and repetition information 1069. Interval information 1071 includes timing structure information on transmission intervals, e.g., periods of time at least two seconds long in which sector 1 transmitter 1028 is controlled to transmit signals into sector 1. Interval information also includes information on periods of time in which sector 1 transmitter 1028 is controlled to transmit beacon signals into sector 1 and information on periods of time during which sector 1 transmitter 1028 is controlled to transmit non-beacon signals into sector 1. Interval information 1071 includes information such as OFDM symbol timing information, e.g., the duration of a single OFDM symbol transmission interval, and timing synchronization information, e.g., with respect to other sectors of the cell and between the downlink and the uplink.

Repetition information 1069 includes information on the periodic repetition of beacon signals and/or beacon signaling intervals. Repetition information 1069 includes on structure which repeat, e.g., slots (grouping of successive OFDM symbol transmission intervals), superslots (grouping of slots), beacon slots (grouping of superlots including one beacon signal), ultra slots (grouping of beacons slots, where some beacon slots within the ultra slot include different beacon signals).

Downlink signals 1088 include OFDM modulation symbols 1067, beacon signals 1065, non-beacon control signals 1063, and user data signals 1061. OFDM modulation symbols 1067 include information conveyed on a modulation symbol, e.g., data, control, and/or pilot information modulated on a symbol, the modulation symbol being conveyed by using a non-beacon tone. Beacon signals 1065 include information identifying a beacon signal to be transmitted, e.g., a beacon signal conveying transmitter information such as carrier information, sector ID information, and/or cell ID information. Non-beacons control signals 1063 include information on signals such assignments, acknowledgements, power control, timing control, and pilot signals and corresponding control segment information. User data signals 1065 include information on user signals such as downlink traffic channel segment signals and corresponding segment information.

Figure 11:
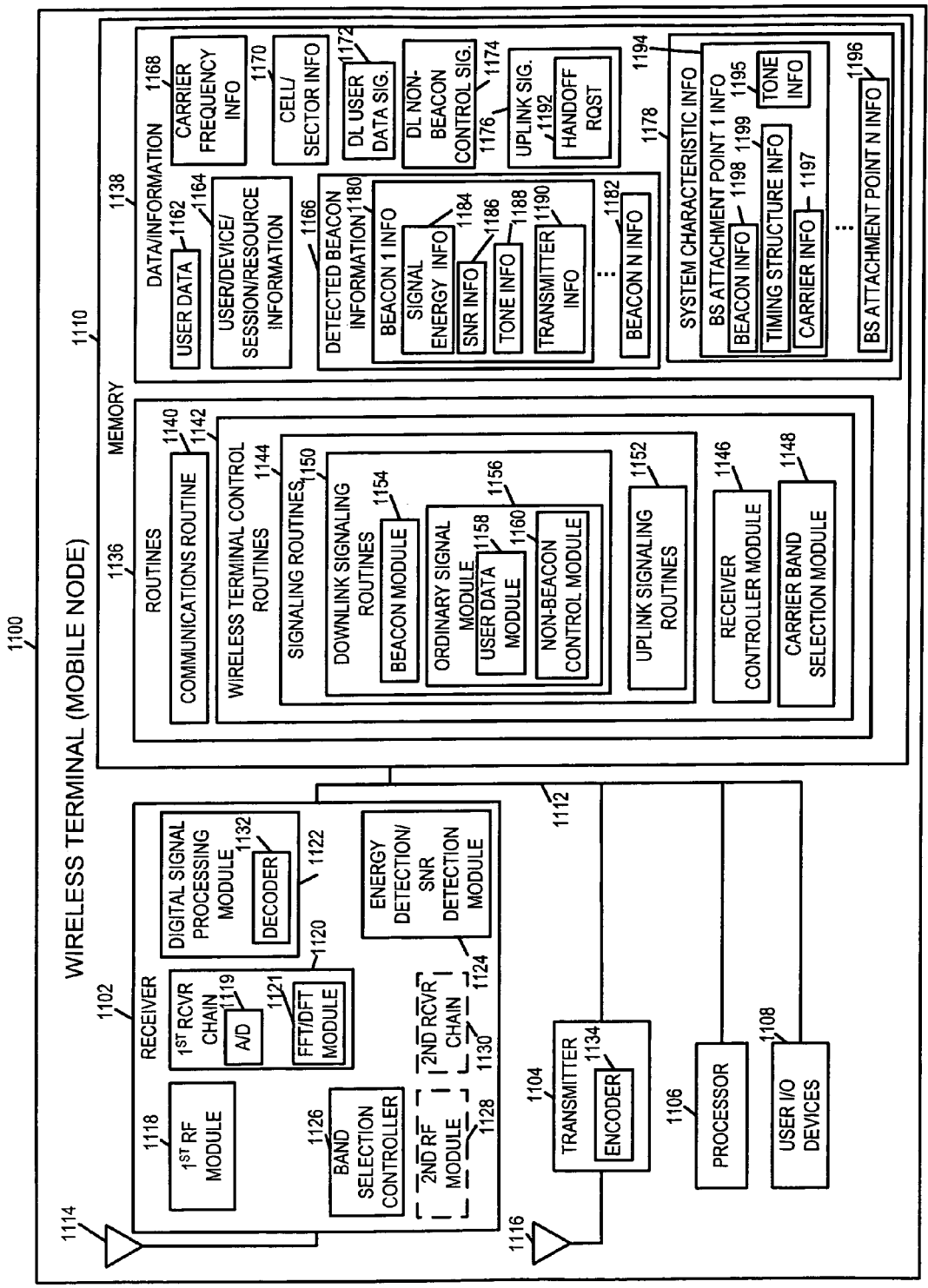
FIG. 11 is a drawing of an exemplary wireless terminal (WT), e.g., mobile node, implemented in accordance with and using methods of the present invention.

FIG. 11 is a drawing of an exemplary wireless terminal (WT) 1100, e.g., mobile node, implemented in accordance with and using methods of the present invention. Exemplary WT 1100 may be any of the WTs (932, 934, 936, 938, 940, 942, 944, 946, 948, 950, 952, 954, 956, 958, 960, 962, 964, 966) of the exemplary system 900 of FIG. 9.

WT 1100 includes a receiver 1102, a transmitter 1104, a processor 1106, e.g., a CPU, user I/O devices 1108, and memory 1110 coupled together via a bus 1112 over which the various elements may interchange data and information. Memory 1110 includes routines 1136 and data/information 1138.

The processor 1106 executes the routines 1136 and data/information 1138 in memory 1110 to control the operation of the WT and implement methods in accordance with the present invention. User I/O devices 1108, e.g., microphone, keyboard, keypad, mouse, video camera, speaker, display, etc., allow a user of the WT to input user data/information to be communicated to another WT participating in a communications session with WT 1100 and to output user data received from another WT participating in a communications session with WT 1100.

Receiver 1102 is coupled to a receive antenna 1114 through which WT 1100 can receive downlink signals from base stations, the downlink signals including beacon signals, user data signals, and non-beacon control signals such as pilot signals, timing control signals, power control signals, assignments, and acknowledgements. Receiver 1118 includes a $1^{st}$ RF module 1118, a first receiver chain 1120, a digital signal processing module 1122, an energy detection/SNR detection module 1124, and a band selection controller 1126. In some embodiments, e.g., some dual RF receiver chain embodiments, receiver 1102 includes a $2^{nd}$ RF module 1128 and a $2^{nd}$ receiver chain 1130.

$1^{st}$ RF module 1118 is tuned to a carrier signal and accepts and processes downlink signals within the carrier signals associated band. $1^{st}$ receiver chain 1120 accepts and process the output signals from the $1^{st}$ RF module 1118. $1^{st}$ RF module 1118 may include an RF filter and/or mixer circuitry. The $1^{st}$ RF module 1118 receives a control input from the band selection controller 1126, e.g., selecting a carrier frequency and tuning the receiver 1102 to the selection.

$1^{ST}$ receiver chain 1 120 includes an A/D module 1119 for performing an analog to digital conversion and a FFT/DFF (fast fourier transform/discrete fourier transform) module 1121 which performs either a FFT or a DFT on the digital signal from the A/D module 1119 output. $1^{st}$ RF chain 1120 may also include additional filters, e.g., baseband filters. Output from the $1^{st}$ receiver chain 1120 is input to the energy detection/SNR detection module 1124.

Energy detection/SNR module 1124 detects energy associated with each of the tones of the downlink band. Beacon signal components may be identified by their relatively high power per tone power with respect to other non-beacon tones. In some embodiments beacon signals may also be detected by SNR measurement information. Note that beacons may be detected without the need for precise timing synchronization, e.g., allowing beacons from multiple unsynchronized base station transmitters transmitted in the same carrier band to be detected and processed.

Non-beacon components, e.g., lower power tones not classified as beacon tones and which have been transmitted from the attachment point base station sector, are processed by the digital signal processing module 1122. The digital signal processing module 1122 performs symbol detection and recovery. Digital signal processing module 1122 operations includes timing synchronization operations. The digital signal processing module 1122 includes a decoder 1132 for decoding information which was encoded by the BS prior to transmission. In some embodiments, the decoder 1132 uses redundant information in the encoded signal to recover information which was lost due to the concurrent transmission of a beacon tone on the same tone used for data or a non-beacon control signal. In some embodiments, the energy detection/SNR detection module 1124 is included as part of the digital signal processing module 1122.

In some embodiments, a $2^{nd}$ RF module 1128 and a $2^{nd}$ receiver chain 1130 are used. The $2^{nd}$ RF module 1128 is similar or the same as $1^{st}$ RF module 1128, while $2^{nd}$ receiver chain 1130 is similar or the same as $1^{st}$ receiver chain 1120. In some embodiments, the $2^{nd}$ RF module 1128 and/or $2^{nd}$ receiver chain 1130 are simpler in complexity, e.g., in terms of the number of gates and/or operations performed, than $1^{st}$ RF module 1118 and $1^{st}$ receiver chain 1120. In an embodiment with both $1^{st}$ and $2^{nd}$ receiver chains, the $1^{st}$ RF module 1118 is tuned to the carrier of the base station sector attachment point transmitters allowing the reception and processing of downlink beacon signals, user data signals, and non-beacon control signals, while the $2^{nd}$ RF module 1128 is tuned, via a band selection controller 1126 control signal to an alternate carrier band and beacon signals within that band are received and processed but no user data signals. Signaling forwarded through the $2^{nd}$ RF module 1128 and $2^{nd}$ receiver chain 1130 is forwarded to the energy detection/SNR detection module 1124 for beacon detection and identification, but is not forwarded to the digital signal processing module 1122 for OFDM modulation symbol information recovery operations.

Transmitter 1104 is coupled to a transmit antenna 1116 through which the WT can send uplink signals including user data and requests for a change of network attachment point, to BSs. Transmitter 1104 includes an encoder 1134 for encoding data/information to be transmitted, e.g., user data.

Routines 1136 includes a communications routine 1140 and wireless terminal control routines 1142. The communications routine 1140 implements the various communications protocols used by WT 1100. The wireless terminal control routines 1142 using the data/information 1138 control the operation of the WT 1100 including implementing methods of the present invention. Wireless terminal control routines 1142 include signaling routines 1144, receiver controller module 1146, and a carrier band selection module 1148.

Signaling routines 1144 include downlink signaling routines 1150 and uplink signaling routines 1152. The downlink signaling routines 1150 control operations pertaining to the reception, recovery, and processing of downlink signals received by receiver 1102. The uplink signaling routines 1152 control operations pertaining to the transmission of uplink signals to the BS sector network attachment point via transmitter 1104.

The downlink signaling routines 1150 include beacon module 1154 and ordinary signaling module 1156. Beacon module 1154 controls operations pertaining to recovery, detection, and identification of beacon signals. For example, based on the signal energy level of a detected received tone exceeding a threshold level, the received tone may be identified by the beacon module 1154 as beacon component tone. Then, by operations including comparing the frequency of the beacon component tone to stored system characteristic information 1178, the beacon module 1154 may identify the beacon signal and obtain beacon source transmitter identification information 1190 such as, e.g., carrier identification, cell identification, and/or sector identification.

Ordinary signaling module 1156 controls operations pertaining to recovery, detection, and identification of data/and information conveyed on non-beacon downlink signals including modulation symbols, e.g., OFDM modulation symbols, which are processed by the digital signal processing module 1122. Ordinary signaling module 1156 includes a user data module 1158 for controlling operations including the recovery of user data, e.g., voice, text, and or video data/information from a peer of WT 1100. Ordinary signaling module 1156 also includes a non-beacon control module 1160 for performing control operation pertaining to the recovery and processing of non-beacon downlink control signals such as, e.g., pilot signals, timing control signals, power control signals, assignments of identifiers and segments, and acknowledgements.

Carrier band selection module 1148 selects the carrier to tune the $1^{st}$ RF module 1118, and in some embodiments, the optional $2^{nd}$ RF module 1128. The carrier band selection module 1146 makes band selection decisions using detected beacon information 1166, e.g., selecting an attachment point and/or selecting to change an attachment point and initiate a handoff. For example, the carrier band selection module 1126 may select to set to $1^{st}$ RF module 1118 to the carrier used for ordinary signaling corresponding to the strongest received beacon signal. In embodiments, using second RF module 1128, the carrier band selection module 1148 may select to set the $2^{nd}$ RF module 1128 to different alternative potential carriers at different times so as to search for additional beacons to evaluate.

Output selection signals from the carrier band selection module 1148 are input to the receiver controller module 1146 which signals the band selection controller 1126 in the receiver 1102 to implement the selection decisions.

Data/information 1138 includes user data 1162, user/device/session/resource information 1164, detected beacon information 1166, carrier frequency information 1168, cell/sector information 1170, downlink user data signals 1172, downlink non-beacon control signals 1174, uplink signals 1176, and system characteristic information 1178.

User data 1162 includes voice, text, and/or video data information to/from a peer WT in a communications session with WT 1100. User/device/session/resource information 1164 includes information identifying users/other WTs, e.g., peers of WT 1100 in communication sessions with WT 1100, routing information, base station identifiers assigned to WT 1100, and segments assigned to WT 1100, e.g., uplink and downlink traffic channel segments.

Detected beacon information 1166 includes a plurality of sets of detected beacon information (beacon 1 information 1180, beacon N information 1182), each set of beacon information corresponding to a detected beacon signal. Beacon 1 information 1180 includes signal energy information 1184, e.g., the energy level of the detected beacon tone or tones, SNR (signal to noise ratio) information 1186 of the detected beacon signal, tone information 1188, e.g., the identified tone or tones of the detected beacon signal each tone with a corresponding energy level in info 1184. Beacon 1 information 1180 also includes transmitter information 1190, e.g., an identified carrier, an identified cell, an identified sector which has been determined to be associated with the source transmitter of the beacon signal. In some embodiments, multiple different beacon signals, e.g., in a sequence of beacon signals from the same base station sector transmitter are received to determine transmitter information 1190.

Carrier frequency information 1168 includes information identifying the current attachment point downlink carrier, e.g., the carrier to which $1^{st}$ RF module 1118 is tuned. Carrier frequency information 1168 also includes information identifying the carrier frequency for uplink signaling to which the transmitter 1104 is tuned.

Cell/sector information 1170 includes information identifying the current BS cell and/or sector attachment point, e.g., a cell identifier such as a value of slope in a pilot tone sequence, and a sector identifier identifying a sector type. Downlink user data signals 1172 include information from received signals including OFDM modulation symbols which have been communicated over downlink traffic channel segments to WT 1100. Downlink non-beacon control signal 1174 include information from received signals including OFDM modulation symbols which have been communicated over downlink control channel segments, such as assignment segments, acknowledgment segments, power control segments, timing control segments, and/or pilot segments to WT 1100. Uplink signals 1176 includes information to be conveyed on uplink channel segments to the BS sector attachment point. Uplink signals 1176 include user data conveyed on uplink traffic channel segments. Uplink signals 1176 also includes handoff request messages 1192 to initiate a handoff request, e.g., in response to a comparison of detected beacon signals. Uplink signals 1176 may also include access signals sent to establish a new wireless link with a base station sector attachment point, e.g., where the base station sector attachment point has been selected based on received and compared beacon signals.

System characteristic information 1178 includes a plurality of sets of BS attachment point information (BS attachment point 1 information 1194, BS attachment point N information 1196), corresponding to the different potential attachment points in the system, e.g., based on cell, sector, and/or carrier frequency. System characteristic information 1178 may be used by the beacon module 1154 when evaluating received beacon information, e.g., tone information 1188 to determine transmitter information 1190. BS attachment point 1 information 1194 includes beacon information 1198, timing structure information 1199, tone information 1195, and carrier information 1197. Beacon information 1198 includes information used to identify the beacons transmitted by the BS attachment point 1 transmitter, e.g., tone sets used for beacon signals, transmission power levels of the beacon tones, types of beacon signals, position of beacon tones within the band of with respect to the lowest tone of the band or with respect to the carrier frequency, and/or tone hopping used by the beacon signals. Timing structure information 1199 includes timing information and/or timing relationships used by the BS attachment point 1 such as OFDM symbol timing, slot timing, superslot timing, beacon slot timing, ultra slot timing, and/or timing relationships to other BS attachment points, e.g., within the same cell. Carrier information 1197 includes information identifying the carriers used for downlink and uplink signaling and associated bandwidths. Tone information 1195 includes information identifying sets of tones associated with the downlink carrier and used to convey downlink signals, as well as any structural information associating specific tones with specific downlink segments at specific times with the timing sequence. Tone information 1195 also includes information identifying sets of tones associated with the uplink carrier and used to convey uplink signals, as well as any structural information associating specific tones with specific uplink segments at specific times with the timing sequence.

Figure 12:
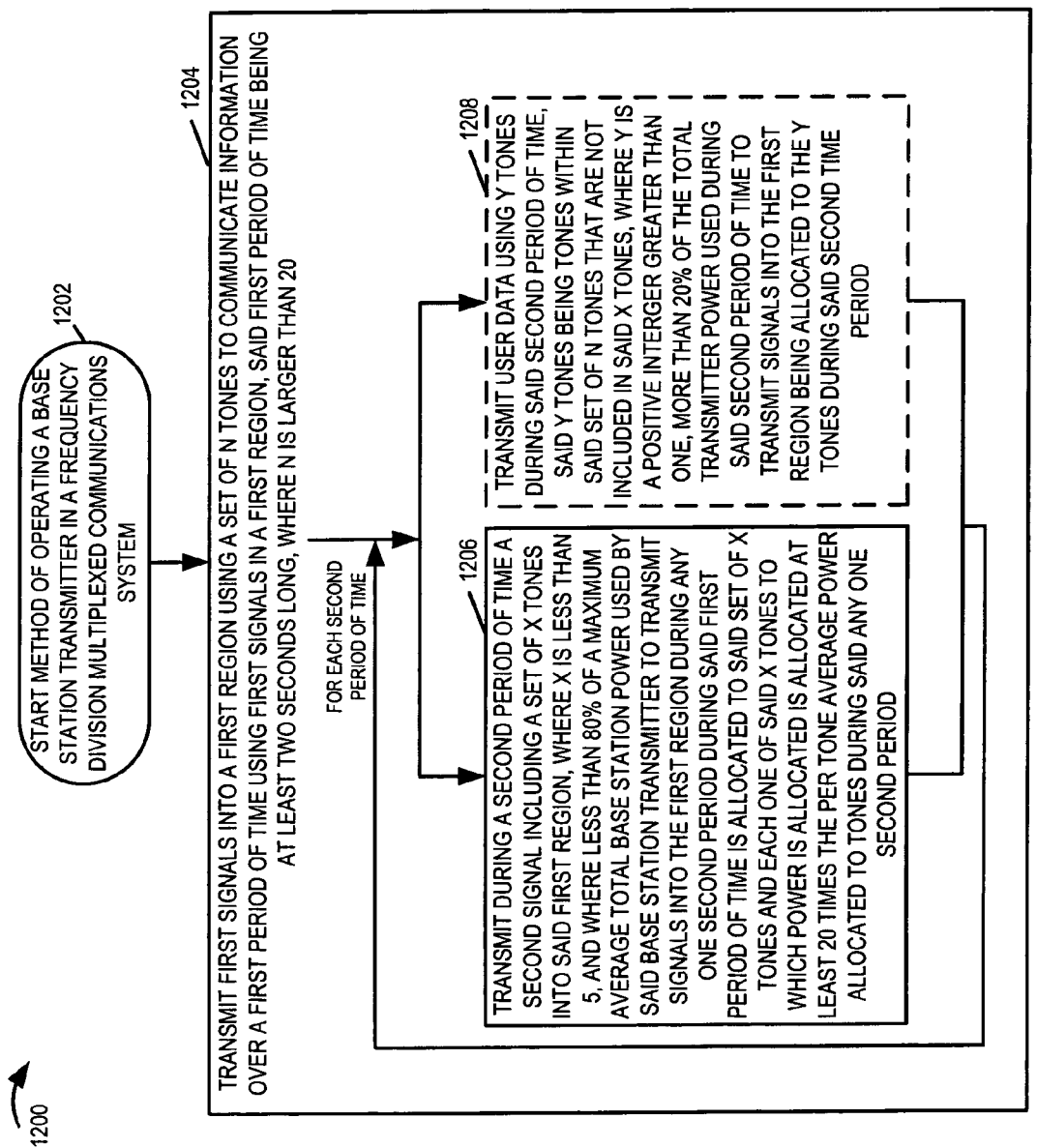
FIG. 12 is a flowchart of an exemplary method of operating a base station transmitter, in a frequency division multiplexed communications system, e.g., and OFDM system, in accordance with the present invention.

FIG. 12 is a flowchart 1200 of an exemplary method of operating a base station transmitter, in a frequency division multiplexed communications system, e.g., and OFDM system, in accordance with the present invention. The transmitter may be, e.g., an OFDM signal transmitter which is a sector transmitter in the base station, and the sector transmitter may correspond to one carrier frequency in a sector of a cell which uses multiple carrier frequencies. Operation starts in step 1202 where the base station is power on and initialized and proceeds to step 1204. In step 1204, the base station transmitter is operated to transmit first signals into a first region, e.g., a sector of a cell, using a set of N tones to communicate information over a first period of time using first signals in a first region, said first period of time being at least 2 seconds long and N being larger than 20.

Step 1204 includes sub-step 1206 and, in some embodiments, optional step 1208. For each second period of time, steps 1206 is performed, and, in some embodiments, optional step 1208 is performed in parallel. In some embodiments, the second period of time periodically repeats during the first period of time. In step 1206, the base station is operated to transmit during a second period of time a second signal into said first region, where X is less than 5, and where less than 80% of a maximum average total base station power used by said base station to transmit signals into the first region during any one second period of time is allocated to said set of X tones and each one of said X tones is allocated at least 20 times the per tone average power allocated to tones during any one second period. In some OFDM embodiments, the second period of time is a period of time used to transmit an orthogonal frequency division multiplexed symbol. In some embodiments, the second period of time occurs within the first period of time and the set of X tones is a subset of the set of N tones. In various embodiments, the user data including at least one of voice, text and image data is communicated on at least one of the N tones transmitted during said first period of time and transmitter information including at least one of sector, cell, and carrier frequency information is transmitted on at least one of said X tones during said second period of time. In some embodiments X is equal to one or two. In some embodiments, e.g., an embodiment without step 1208, none of the N-X tones in said set of N tones but not in said set of X tones are used during said second period of time. In some embodiments, at least half of the N-X tones which are in the set of N tones but not in said set on X tones go unused during said second period of time in the first region. In various embodiments, multiple ones of the N-X tones in said set of X tones are used during second period of time in the first region.

In step 1208, the base station is operated to transmit user data using Y tones during said second period of time, said Y tones being tones within said set of X tones, where Y is a positive integer greater than one, more than 20% of the total transmitter power used during said second period of time to transmit signals into the first region being allocated to the Y tones during said second period of time. In some embodiments more than 50% of the total transmitter power used during said second period of time to transmit signals into the first region is allocated to the Y tones during said second period of time. In some embodiments, said Y tones includes at least 70 tones. In various embodiments, transmitting user data includes transmitting modulated symbols on said Y tones, each of the Y tones communicating one symbol.

Figure 13:
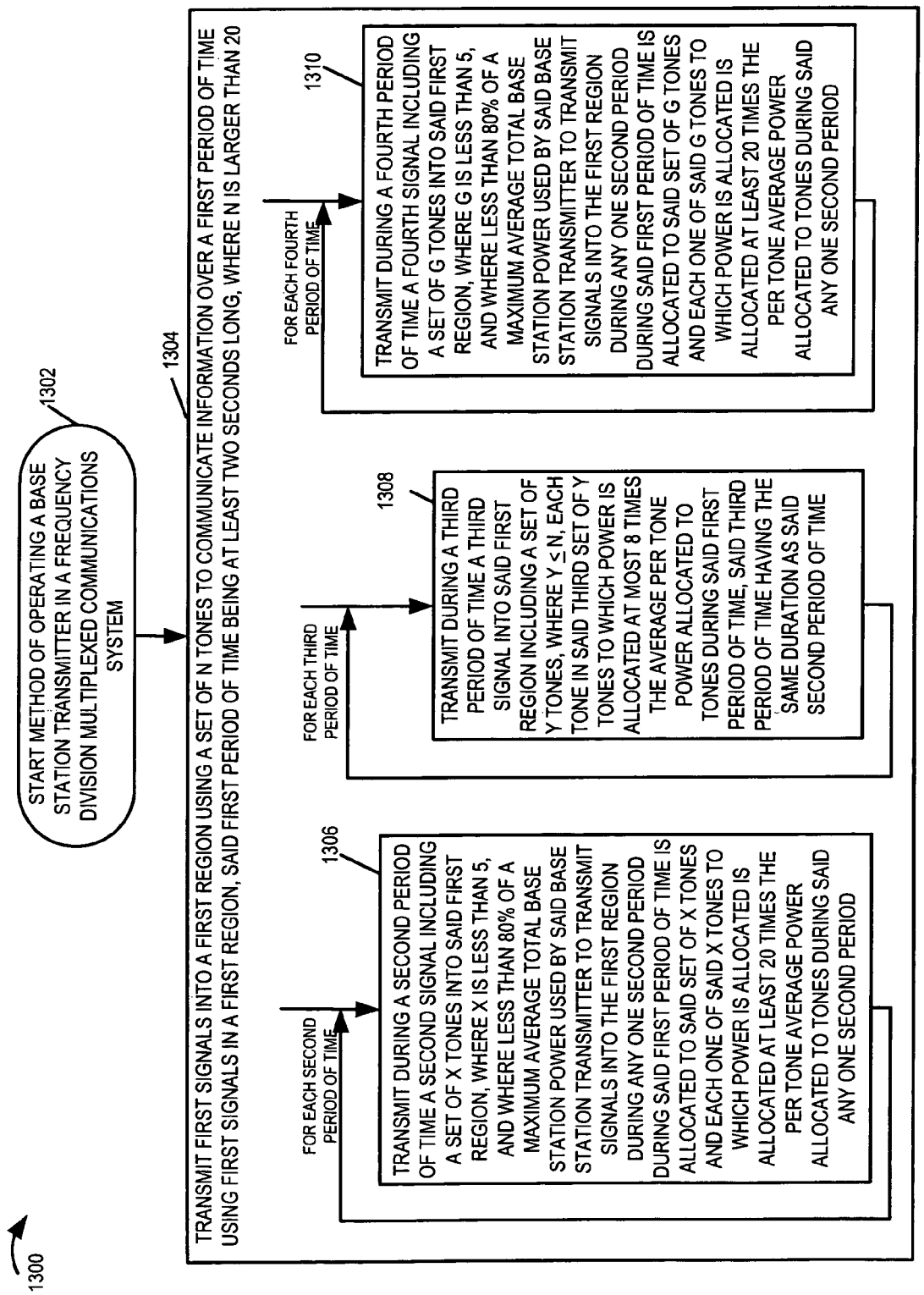
FIG. 13 is flowchart of another exemplary method of operating a base station transmitter in a frequency division multiplexed system in accordance with the present invention.

FIG. 13 is flowchart 1300 of another exemplary method of operating a base station in a frequency division multiplexed system in accordance with the present invention. Operation starts in step 1302 where the base station is powered on and initialized and proceeds to step 1304.

In step 1304, the base station transmitter is operated to transmit first signals into a first region using a set of N tones to communicate information over a first period of time using first signals in a first region, said first period of time being at least two seconds long, where N is larger than 20. Step 1304 includes sub-steps 1306, 1308, and 1310. In sub-step 1306, for each second period of time, the base station transmitter is operated to transmit during a second period of time a second signal including a set of X tones into said first region, where X is less than 5, and where less than 80% of a maximum average total base station power used by said base station transmitter to transmit signals into the first region during any one second period during said first period of time is allocated to said set of X tones and each one of said X tones to which power is allocated is allocated at least 20 times the per tone average power allocated to tones during said any one second period. In sub-step 1308, for each third period of time, the base station transmitter is operated to transmit during a third period of time a third signal into said first region including a set of Y tones, where $Y \leq N$, each tone in said third set of tones to which power is allocated is allocated at most 8 times the average power allocated to tones during said first period of time, said third period of time having the same duration as said second period of time. In sub-step 1310, for each fourth period of time, the base station is operated to transmit during a fourth period of time a fourth signal including a set of G tones into said first region, where G is less than 5, and where less than 80% of a maximum average total base station power used by said base station transmitter to transmit signals into the first region during any one second period of time during the first period of time is allocated to said set of G tones and each one of said G tones to which power is allocated is allocated at least 20 times the per tone average power allocated to tones during said any one second period of time.

In some embodiments, the third period of time and said second period of time overlap, and the method further comprises modulating at least two of data, control and pilot signals on at least some of said set of Y tones. In some embodiments, the third period of time and the second period of time are disjoint, and the method further comprises modulating at least two of data, control and pilot signals on at least some of said set of Y tones. In various embodiments, at least one of said X tones is transmitted at predetermined fixed frequency and said at least one of said X tones is transmitted using a frequency having a fixed frequency offset $\geq 0$ from the lowest frequency tone in said set of N tones. In some embodiments, at least one of said X tones is transmitted at a frequency which is determined as a function of at least one of a base station identifier and a sector identifier.

In some embodiments, for each repetition of said second period of time in said first period of time there are at least Z repetitions of said third period of time in said first period of time, where Z is greater than 10. In various embodiments Z is greater than 400.

In some embodiments, the frequency of at least one of said G tones is a function of at least one of a base station identifier and a sector identifier and said at least one of G tones is not one of said set of X tones. For example, the at least one of X tones may correspond to a carrier beacon signal and the at least one of G tones may correspond to a cell/sector beacon, and the second time period and the fourth time period do not overlap. In some embodiments, the second and fourth time periods periodically repeat during the first period of time. In some embodiments, the second and fourth time periods repeat at different rates.

Figure 14:
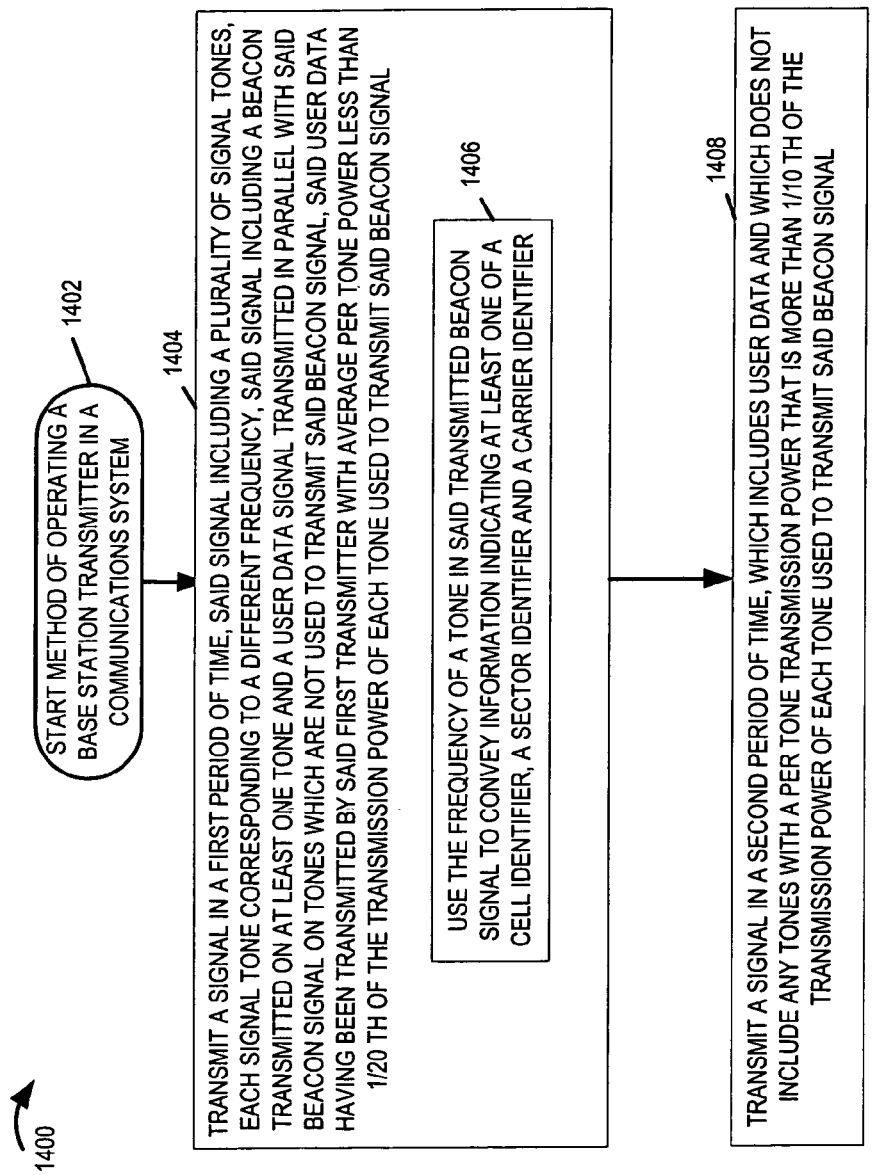
FIG. 14 is a flowchart of an exemplary method of operating a base station transmitter in a communications system in accordance with the present invention.

FIG. 14 is a flowchart 1400 of an exemplary method of operating a base station transmitter in a communications system in accordance with the present invention. In some embodiments, the base station transmitter is a sector transmitter of a base station. In various embodiments, the sector transmitter corresponds to a single one of a plurality of carrier frequencies used by a sector of a base station. Operation starts in step 1402 where the base station transmitter is powered on and initialized. Operation proceeds from step 1402 to step 1404.

In step 1404, the base station transmitter is operated to transmit a signal in a first period of time, said signal including a plurality of signal tones, each signal tone corresponding to a different frequency, said signal including a beacon transmitted on at least one tone and a user data signal transmitted in parallel with said beacon signal on tones which are not used to transmit said beacon signal, said user data having been transmitted by said first transmitter with average per tone power less than $\frac{1}{20}$th of the transmission power of each tone used to transmit said beacon signal.

Step 1404 includes sub-step 1406. In sub-step 1406, the base station transmitter uses the frequency of a tone in said transmitted beacon signal to convey information indicating at least one of a cell identifier, a sector identifier, and a carrier identifier. Operation proceeds from step 1404 to step 1408.

In some embodiments, the step of transmitting a signal in a first period of time includes transmitting user data on at least 100 tones and transmitting said beacon on less than 3 tones. In some embodiments at least N times the average per signal tone energy of said transmitted signal is transmitted on each of the tones in the signal used to transmit said beacon signal, where N is a positive value greater than 5, 20, 99, or 150.

In various embodiments, the beacon signal is transmitted into a frequency band used by a base station located adjacent a cell in which said base station is located which is not used by said base station to transmit user data.

In step 1408 the base station transmitter is operated to transmit a signal in a second period of time, which includes user data and which does not include any tones with a per tone transmission power that is more than $\frac{1}{10}^{th}$ of the transmission power of each tone used to transmit the beacon signal.

In one particular exemplary method of operating a base station transmitter in a frequency division multiplexed communications system in accordance with the invention, the method includes the steps of: transmitting first signals into a first region, e.g., sector, using a set of N tones to communicate information over a first period of time, said first period of time being at least two seconds long, where N is larger than 10; and transmitting during a second period of time a second signal including a set of X tones into said first region, where X is less than 5, and where less than 80% of a maximum average total base station transmission power used by said base station transmitter to transmit signals into the first region during any 1 second period during said first period of time is allocated to said set of X tones (sometime X is one or two) and each one of said X tones to which power is allocated receives at least 20 times (and sometimes 40, 60 or more times) the per tone average power allocated to tones during said any one second period. In some implementations, the first region is a sector of a cell; and said communications system is an orthogonal frequency division multiplexed system and wherein said second period of time is a period of time used to transmit an orthogonal frequency division multiplexed symbol. The particular exemplary method may include transmitting during a third period of time a third signal (e.g., a non-beacon signal) into said first region, said third signal not including said second signal, said third signal including a set of Y tones, where $Y \leq N$, each tone in said third set of Y tones to which power is allocated at most 8 times the average per tone power allocated to tones during said first period of time. The method sometimes further includes modulating at least data, control and pilot signals on said set of Y tones. The different information may be modulated on different tones, e.g., with data being modulated on one tone or more tones, control on other tones and pilot signals on still other tones. In some implementations at least one of said X tones is transmitted at a transmission frequency which is determined as a function of at least one of a base station identifier and a sector identifier. In some implementations, for each repetition of said second period of time in said first period of time there are at least Z repetitions of said third period of time in said first period of time where Z is at least 10, but in some cases at least 20, 40 or 400. Thus, in a two second time interval, the method may involve several beacon time periods but many more time periods in which beacon signals are not transmitted, e.g., sometimes over 400 user data time periods for each beacon signal time period. Each of the second and third time periods may include one or multiple OFDM symbol transmission time periods. The second and third time periods may be the same or different in terms of duration depending on the implementation. Notably, user data signal tones are normally transmitted at ⅛ the average transmission power allocated to beacon signal tones which are transmitted at much higher power levels than the user data signal tones, e.g., 20 times or more the power level in some cases. The above described method implementations are only some exemplary implementations, and are not the only method implementations which are possible in accordance with the invention.

In one exemplary embodiment, a base station transmitter for use in a communication system, includes a transmitter for transmitting signals including multiple tones, each tone corresponding to a different frequency; and a transmitter control module for controlling the transmitter to transmit a signal in a single symbol transmission time period using a plurality of signal tones that are transmitted in parallel, each signal tone corresponding to a different frequency, said control means causing user data to be transmitted on signal tones with more than 20% of the base stations transmitter's maximum possible transmission power for a symbol time period being placed on tones used to communicate user data, said signal also including a beacon signal transmitted on at least one tone on which user data is not transmitted, said beacon signal being transmitted with more than 20 times the transmission power of any of the signal tones used to transmit user data. In some implementations, the transmitter control module controls the transmitter to transmit the beacon signal in a frequency band used by an adjacent transmitter to transmit user data and which is not used by said transmitter to transmit user data, e.g., the beacon signal is transmitted into the frequency band normally used by a neighboring sector or base station transmitter for establishing communications links with WTs being serviced by the transmitter. In some cases, the second period of time occurs within said first period of time; and the X tones is a subset of said N tones. The base station in the exemplary base station embodiment being described includes stored user data including at least one of voice, text and image data to be communicated; and the first control module includes control logic for controlling the transmitter to transmit user data on at least one tone during said first period of time and to transmit user data on a plurality of Y tones which are a subset of said N tones, said Y tones not being included in said X tones during said second period of time.

In yet another exemplary base station embodiment, a base station transmitter of the invention which is for use in a communication system, e.g., an OFDM communications system includes: a transmitter for transmitting signals including multiple tones, each tone corresponding to a different frequency; and a transmitter control module for controlling the transmitter to transmit a signal in a single symbol transmission time period using a plurality of signal tones that are transmitted in parallel, each signal tone corresponding to a different frequency, said control means causing user data to be transmitted on signal tones with more than 20% of the base stations transmitter's maximum possible transmission power for a symbol time period being placed on tones used to communicate user data, said signal also including a beacon signal transmitted on at least one tone on which user data is not transmitted, said beacon signal being transmitted with more than 20 times the transmission power of any of the signal tones used to transmit user data. The base station transmitter control module may include logic for controlling the transmitter to transmit said beacon signal in a frequency band used by an adjacent transmitter to transmit user data and which is not used by said transmitter to transmit user data. The transmitter may be a sector transmitter in which case the first region is a sector of a cell, In some embodiments said communications system is an orthogonal frequency division multiplexed system and the second period of time is a period of time used to transmit an orthogonal frequency division multiplexed symbol. In some base station implementations, at least one of the X tones used by the base station is transmitted at a frequency which is determined as a function of at least one of a base station identifier and a sector identifier. The base station includes control circuitry and/or logic for transmitting during a third period of time a third signal into said first region, the third signal, e.g., a user data signal, not including said second signal which may be, e.g., a beacon signal, said third signal including a set of Y tones, where $Y \leq N$, each tone in said third set of Y tones to which power is allocated having at most 8 times the average per tone power allocated to tones during said first period of time. Thus, in such an implementation, signals corresponding to user data will be transmitted with much less power, eg. . . . , ¹⁄₂₀ or less of the power allocated to beacon signal tones. The base station includes a control module and/or logic for transmitting during a third period of time a third signal into said first region, aid third signal not including said second signal, said third signal including a set of Y tones, where $Y \leq N$, each tone in said third set of Y tones to which power is allocated at most 8 times the average per tone power allocated to tones during said first period of time, said third period of time having the same duration as said second period of time, wherein for each repetition of said second period of time in said first period of time there are at least Z repetitions of said third period of time in said first period of time where Z is at least 10 and, in some cases Z is at least 400.

While described primarily in the context of an OFDM system, the methods and apparatus of the present invention, are applicable to a wide range of communications systems including many non-OFDM and/or non-cellular systems.

Control modules, e.g., transmission control modules, implemented in accordance with the invention may perform multiple transmission control operations. In such a case, the module includes circuitry and/or logic, e.g., stored instructions, for performing each of the control operations attributed to the control module. Thus, a single control module may multiple means, one for performing each control operation attributed to the control module. Similarly, routines may include instructions for performing multiple operations where the instructions corresponding to a particular operation represent a means for performing the operation.

In various embodiments nodes described herein are implemented using one or more modules to perform the steps corresponding to one or more methods of the present invention, for example, carrier band selection, digital signal processing, energy detection/SNR detection, decoding, timing synchronization, signal quality detection, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a base station transmitter in a frequency division multiplexed communications system, the method comprising:
    transmitting first signals into a first region using a set of N tones to communicate information over a first period of time, said first period of time being at least two seconds long, where N is larger than 10; and
    transmitting during a second period of time a second signal including a set of X tones into said first region, where X is less than 5, and where less than 80% of a maximum average total base station transmission power used by said base station transmitter to transmit signals into the first region during any 1 second period during said first period of time is allocated to said set of X tones and each one of said X tones to which power is allocated receives at least 20 times the per tone average power allocated to tones during said any one second period.

2. The method of claim 1,
    wherein said second period of time occurs within said first period of time; and
    wherein said X tones is a subset of said N tones.

3. The method of claim 2, wherein user data including at least one of voice, text and image data is communicated on at least one of the N tones transmitted during said first period of time; and
    wherein transmitter information including at least one of sector, cell and carrier frequency information is transmitted on at least one of said X tones during said second period of time.

4. The method of claim 1, further comprising:
    transmitting user data using Y tones during said second period of time, said Y tones being tones within said set of N tones that are not included in said X tones, where Y is a positive integer greater than one, more than 20% of the total transmitter power used during said second period of time being allocated to the Y tones during said second time period.

5. The method of claim 4, wherein more than 50% of the total transmitter power used during said second period of time is allocated to the Y tones during said second time period.

6. The method of claim 4, wherein said Y tones includes at least 70 tones.

7. The method of claim 4, wherein transmitting user data includes transmitting modulated symbols on said Y tones, each of the Y tones communicate one symbol.

8. The method of claim 7, wherein said transmitter is an OFDM signal transmitter.

9. The method of claim 7, wherein said transmitter is a sector transmitter in a base station.

10. The method of claim 7, wherein said transmitter is a sector transmitter corresponding to one carrier frequency in a sector of a cell which uses multiple carrier frequencies.

11. The method of claim 1, wherein said first region is a sector of a cell.

12. The method of claim 1, where X is equal one or two.

13. The method of claim 1, wherein at least half of the N-X tones which are in said set of N tones but not in said set of X tones go unused during said second period of time in the first region.

14. The method of claim 13, wherein none of the N-X tones in said set of N tones but not in said set of X tones are used during said second period of time in the first region.

15. The method of claim 13, wherein multiple ones of the N-X tones in said set of N tones but not in said set of X tones are used during said second period of time in the first region.

16. The method of claim 1,
    wherein said first region is a sector of a cell; and
    wherein said communications system is an orthogonal frequency division multiplexed system and wherein said second period of time is a period of time used to transmit an orthogonal frequency division multiplexed symbol.

17. The method of claim 16, wherein said second period of time periodically repeats during said first period of time.

18. The method of claim 16, wherein said method further comprises:
    transmitting during a third period of time a third signal into said first region, said third signal not including said second signal, said third signal including a set of Y tones, where $Y \leq N$, each tone in said third set of Y tones to which power is allocated at most 8 times the average per tone power allocated to tones during said first period of time.

19. The method of claim 18, wherein said third period of time and said second period of time overlap, the method further comprising:
    modulating at least two of data, control and pilot signals on at least some of said set of Y tones.

20. The method of claim 18, wherein said third period of time and said second period of time are disjoint, the method further comprising:
    modulating at least two of data, control and pilot signals on at least some of said set of Y tones.

21. The method of claim 16,
    wherein at least one of said X tones is transmitted at predetermined fixed frequency; and
    wherein said at least one of said X tones is transmitted using a frequency having a fixed frequency offset$\geq 0$ from the lowest frequency tone in said set of N tones.

22. The method of claim 16,
    wherein at least one of said X tones is transmitted at a transmission frequency which is determined as a function of at least one of a base station identifier and a sector identifier.

23. The method of claim 18, wherein for each repetition of said second period of time in said first period of time there are at least Z repetitions of said third period of time in said first period of time where Z is at least 10.

24. The method of claim 23, wherein Z is at least 400.

25. The method of claim 16, further comprising:
    transmitting during a fourth period of time a fourth signal including G tones into the first region, where G is less than 5, and where less than 80% of said maximum average total base station transmitter power used by said base station transmitter to transmit into said first region during any 1 second period during said first period of time is allocated to said G tones and each one of said G tones to which power is allocated is allocated at least 20 times the per tone power allocated to tones during said any 1 second period.

26. The method of claim 25,
wherein the frequency of at least one of said G tones is a function of at least one of a base station identifier and a sector identifier, and
wherein said at least one of said G tones is not one of said set of X tones.

27. The method of claim 26, wherein said second and fourth periods of time periodically repeat during said first period of time.

28. A base station for use in a frequency division multiplexed communications system, the base station comprising:
a transmitter that uses a set of N tones to communicate information into a first region, where N is larger than 10;
first control means coupled to said transmitter, for controlling the transmitter to transmit over a first period of time using first signals into the first region, said first period of time being at least two seconds long; and
second control means coupled to said transmitter for controlling the transmitter to transmit during a second period of time a second signal including a set of X tones into said first region, where X is a positive integer less than 5, and where less than 80% of a maximum average total base station transmission power used by said base station transmitter to transmit into the first region during any 1 second period during said first period of time is allocated to said set of X tones and where each one of said X tones to which power is allocated is at least 20 times the per tone maximum average power allocated to tones during any one second time period in said first time period.

29. The base station of claim 28,
wherein said second period of time occurs within said first period of time; and
wherein said X tones is a subset of said N tones.

30. The base station of claim 29, further comprising:
stored user data including at least one of voice, text and image data to be communicated; and
wherein said first control means controls said transmitter to transmit user data on at least one tone during said first period of time and to transmit user data on a plurality of Y tones which are a subset of said N tones, said Y tones not being included in said X tones during said second period of time.

31. The base station of claim 29, wherein said control means allocates more than 20% of the total transmitter power used during said second period of time to the Y tones during said second time period.

32. The base station of claim 31, where said control means allocates more than 50% of the total transmitter power used during said second period of time to the Y tones during said second time period.

33. The base station of claim 32, where Y is greater than 50.

34. The base station of claim 28,
wherein said first region is a sector of a cell; and
wherein said communications system is an orthogonal frequency division multiplexed system and wherein said second period of time is a period of time used to transmit an orthogonal frequency division multiplexed symbol.

35. The base station of claim 28, wherein at least one of said X tones is transmitted at a frequency which is determined as a function of at least one of a base station identifier and a sector identifier.

36. The base station of claim 28, further comprising:
control means for transmitting during a third period of time a third signal into said first region, aid third signal not including said second signal, said third signal including a set of Y tones, where $Y \leq N$, each tone in said third set of Y tones to which power is allocated at most 8 times the average per tone power allocated to tones during said first period of time.

37. The base station of claim 28, further comprising:
control means for transmitting during a third period of time a third signal into said first region, aid third signal not including said second signal, said third signal including a set of Y tones, where $Y \leq N$, each tone in said third set of Y tones to which power is allocated at most 8 times the average per tone power allocated to tones during said first period of time, said third period of time having the same duration as said second period of time;
wherein for each repetition of said second period of time in said first period of time there are at least Z repetitions of said third period of time in said first period of time where Z is at least 10.

38. The base station of claim 37, wherein Z is at least 400.

39. A method of operating a base station transmitter in a communication system, the method comprising:
transmitting a signal in a first period of time, said signal including a plurality of M signal tones, where M is larger than 10, each signal tone corresponding to a different frequency, said first period of time being at least two seconds long, said signal including a beacon signal transmitted on at least one tone and a user data signal transmitted in parallel with said beacon signal on tones which are not used to transmit said beacon signal, said user data having been transmitted by said base station transmitter with more than 20% of the maximum average total base station transmission power used by said base station transmitter to transmit signals into a first region during any 1 second period of time during said first period of time.

40. The method of claim 39, wherein at least N times the average per signal tone energy of said transmitted signal is transmitted on each of the tones in the signal used to transmit said beacon signal, where M is a positive value greater than 5.

41. The method of claim 39, wherein at least N times the average per signal tone energy of said transmitted signal is transmitted on each of the tones in the signal used to transmit said beacon signal, where N is a positive value greater than 20.

42. The method of claim 39, wherein at least N times the average per signal tone energy of said transmitted signal is transmitted on each of the tones in the signal used to transmit said beacon signal, where N is a positive value greater than 99.

43. The method of claim 42, wherein at least N times the average per signal tone energy of said transmitted signal is transmitted on each of the tones in the signal used to transmit said beacon signal, where N is a positive value greater than 150.

44. The method of claim 40, further comprising:
using the frequency of a tone in said transmitted beacon signal to convey information indicating at least one of a cell identifier, a sector identifier and a carrier identifier.

45. The method of claim 44, wherein said beacon signal is transmitted into a frequency band used by a base station located adjacent a cell in which said base station transmitter is located which is not used by said base station transmitter to transmit user data.

46. The method of claim 45, wherein said step of transmitting a signal in a first period of time includes transmitting user data on at least 100 tones and transmitting said beacon signal on less than 3 tones.

47. The method of claim 46, further comprising:
transmitting a signal in a second period of time, which includes user data and which does not include any tones with a per tone transmission power that is more than $\frac{1}{10}$th of the transmission power of each tone used to transmit said beacon signal.

48. The method of claim 39, wherein said base station transmitter is a sector transmitter of a base station.

49. The method of claim 48, wherein said base station transmitter is a sector transmitter corresponding to a single one of a plurality of carrier frequencies used by a sector of a base station.

50. The method of claim 39, wherein at least one tone of the beacon signal is transmitted at a frequency which is determined as a function of at least one of a base station identifier and a sector identifier.

51. The method of claim 39,
wherein said first region is a sector of a cell; and
wherein said communications system is an orthogonal frequency division multiplexed system and wherein said beacon signal is transmitted during a second period of time and wherein said second period of time is within said first period of time, said second period of time being a period of time used to transmit an orthogonal frequency division multiplexed symbol.

52. The method of claim 51, wherein said method further comprises:
transmitting during a third period of time a third signal into said first region, said third signal not including said second signal, said third signal including a set of Y tones, where $Y \leq M$, each tone in said third set of Y tones to which power is allocated at most 8 times the average per tone power allocated to tones during said first period of time.

53. The method of claim 51, wherein said method further comprises:
transmitting during a third period of time a third signal into said first region, said third signal not including said second signal, said third signal including a set of Y tones, where $Y \leq M$, each tone in said third set of Y tones to which power is allocated at most 8 times the average per tone power allocated to tones during said first period of time, said third period of time having the same duration as said second period of time;
wherein for each repetition of said second period of time in said first period of time there are at least Z repetitions of said third period of time in said first period of time where Z is at least 10.

54. The method of claim 53, where Z is at least 400.

55. A base station transmitter assembly for use in a communication system, the transmitter assembly comprising:
a transmitter for transmitting signals including multiple tones, each tone corresponding to a different frequency; and
transmitter control means for controlling the transmitter to transmit a signal in a single symbol transmission time period using a plurality of signal tones that are transmitted in parallel, each signal tone corresponding to a different frequency, said control means causing user data to be transmitted on signal tones with more than 20% of the transmitter's maximum possible transmission power for a symbol time period being placed on tones used to communicate user data, said signal also including a beacon signal transmitted on at least one tone on which user data is not transmitted, said beacon signal being transmitted with more than 20 times the transmission power of any of the signal tones used to transmit user data.

56. The base station transmitter assembly of claim 55, wherein said transmitter control means controls said transmitter to transmit said beacon signal in a frequency band used by an adjacent transmitter to transmit user data and which is not used by said transmitter to transmit user data.

57. The base station transmitter assembly of claim 55, wherein at least one of the tones included in the beacon signal is transmitted at a frequency which is determined as a function of at least one of a base station identifier and a sector identifier.

58. The base station transmitter assembly of claim 55,
wherein said transmitter transmits into a first region during a first period of time, the first region being a sector of a cell; and
wherein said communications system is an orthogonal frequency division multiplexed system and wherein said beacon signal is transmitted during a second period of time within said first period of time, said second period of time being a period of time used to transmit an orthogonal frequency division multiplexed symbol.

59. The base station transmitter assembly of claim 58, further comprising:
control means for transmitting during a third period of time a third signal into said first region, said third signal not including said second signal, said third signal including a set of Y tones, where $Y \leq N$, where N is the set of tones used by the transmitter for downlink signaling, each tone in said third set of Y tones to which power is allocated at most 8 times the average per tone power allocated to tones during said first period of time.

60. The base station transmitter assembly of claim 58, further comprising:
control means for transmitting during a third period of time a third signal into said first region, said third signal not including said second signal, said third signal including a set of Y tones, where $Y \leq N$, where N is the set of tones used by the transmitter for downlink signaling, each tone in said third set of Y tones to which power is allocated at most 8 times the average per tone power allocated to tones during said first period of time, said third period of time having the same duration as said second period of time; and
wherein for each repetition of said second period of time in said first period of time there are at least Z repetitions of said third period of time in said first period of time where Z is at least 10.

61. The base station transmitter assembly of claim 60 where Z is at least 400.

* * * * *

UNITED STATES PATENT AND TRADEMARK OFFICE
CERTIFICATE OF CORRECTION

PATENT NO. : 7,379,446 B2  Page 1 of 1
APPLICATION NO. : 10/965011
DATED : May 27, 2008
INVENTOR(S) : Rajiv Laroia, Frank A. Lane and Junyi Li It is certified that error appears in the above-identified patent and that said Letters Patent is hereby corrected as shown below:

In the abstract (57), L 12, "that that", should read, --that--.
In column 26, claim 12, line 10, "equal one or two", should read, --equal to one or two--.
In column 28, claim 36, line 10, "aid third signal", should read, --said third signal--.
In column 28, claim 37, line 18, "aid third signal", should read, --said third signal--.

Signed and Sealed this

Third Day of August, 2010

David J. Kappos
*Director of the United States Patent and Trademark Office*